US012627385B2

(12) United States Patent
Liu et al.

(10) Patent No.: US 12,627,385 B2
(45) Date of Patent: May 12, 2026

(54) TECHNIQUES FOR WIDEBAND INTERFERENCE MEASUREMENTS

(71) Applicant: QUALCOMM Incorporated, San Diego, CA (US)

(72) Inventors: Kangqi Liu, San Diego, CA (US); Weimin Duan, San Diego, CA (US); Tingfang Ji, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 18/356,023

(22) Filed: Jul. 20, 2023

(65) Prior Publication Data

US 2025/0030493 A1 Jan. 23, 2025

(51) Int. Cl.
| | |
|---|---|
| *H04B 17/345* | (2015.01) |
| *H04W 8/24* | (2009.01) |
| *H04W 24/10* | (2009.01) |
| *H04W 52/02* | (2009.01) |

(52) U.S. Cl.
CPC ................................. *H04B 17/345* (2015.01)

(58) Field of Classification Search
None
See application file for complete search history.

(56) References Cited

U.S. PATENT DOCUMENTS

| | | | | |
|---|---|---|---|---|
| 2005/0164642 A1* | 7/2005 | Roberts | ............... | H04W 52/346 |
| | | | | 375/285 |
| 2010/0222063 A1* | 9/2010 | Ishikura | ................. | H04B 7/024 |
| | | | | 455/450 |
| 2012/0208547 A1* | 8/2012 | Geirhofer | ............. | H04W 24/10 |
| | | | | 455/452.2 |
| 2014/0024388 A1* | 1/2014 | Earnshaw | ............. | H04L 5/0073 |
| | | | | 455/452.2 |

(Continued)

OTHER PUBLICATIONS

International Search Report and Written Opinion—PCT/US2024/035619—ISA/EPO —Oct. 8, 2024.

*Primary Examiner* — Jenee Holland
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit, to a network node, a capability report indicating one or more capability parameters that are associated with wideband interference measurement of an orthogonal frequency division multiplexing (OFDM) channel and a supported subband size for the OFDM channel. The UE may receive, from the network node, configuration information indicating an interference measurement resource associated with a set of frequency domain resources, wherein the set of frequency domain resources includes a greater number of frequency domain resources than the supported subband size. The UE may measure, based on the reception of the configuration information, the interference measurement resource to obtain interference (Continued)

700 →

Network Node 110 — UE 120

705
Capability report

710
Configuration information
(IM resource configuration)

715
Perform interference measurement via IM resource using an FMCW-based receiver 720
Determine one or more subbands based on the interference measurement 725
Trigger an interference measurement report 730
Interference measurement report measurement information associated with the OFDM channel. The UE may transmit, to the network node, a measurement report indicating the interference measurement information. Numerous other aspects are described.

30 Claims, 12 Drawing Sheets

(56)                          References Cited

U.S. PATENT DOCUMENTS

| 2016/0099794 | A1* | 4/2016 | Chendamarai Kannan ................ H04W 72/23 370/329 |
| 2018/0167954 | A1* | 6/2018 | Wakabayashi ....... H04B 7/0632 |
| 2021/0067991 | A1 | 3/2021 | Zhu et al. |
| 2022/0070793 | A1* | 3/2022 | Raghavan ............ H04B 17/327 |
| 2022/0095142 | A1 | 3/2022 | Landis et al. |
| 2023/0141170 | A1 | 5/2023 | Dai et al. |
| 2023/0170962 | A1* | 6/2023 | Ali ....................... H04B 7/0626 370/252 |
| 2023/0224747 | A1 | 7/2023 | Xu et al. |
| 2023/0353210 | A1* | 11/2023 | Hao ..................... H04B 7/0691 |
| 2023/0354245 | A1* | 11/2023 | Manolakos ........... H04L 5/0048 |
| 2024/0204841 | A1* | 6/2024 | Abotabl ............... H04L 1/0026 |

* cited by examiner

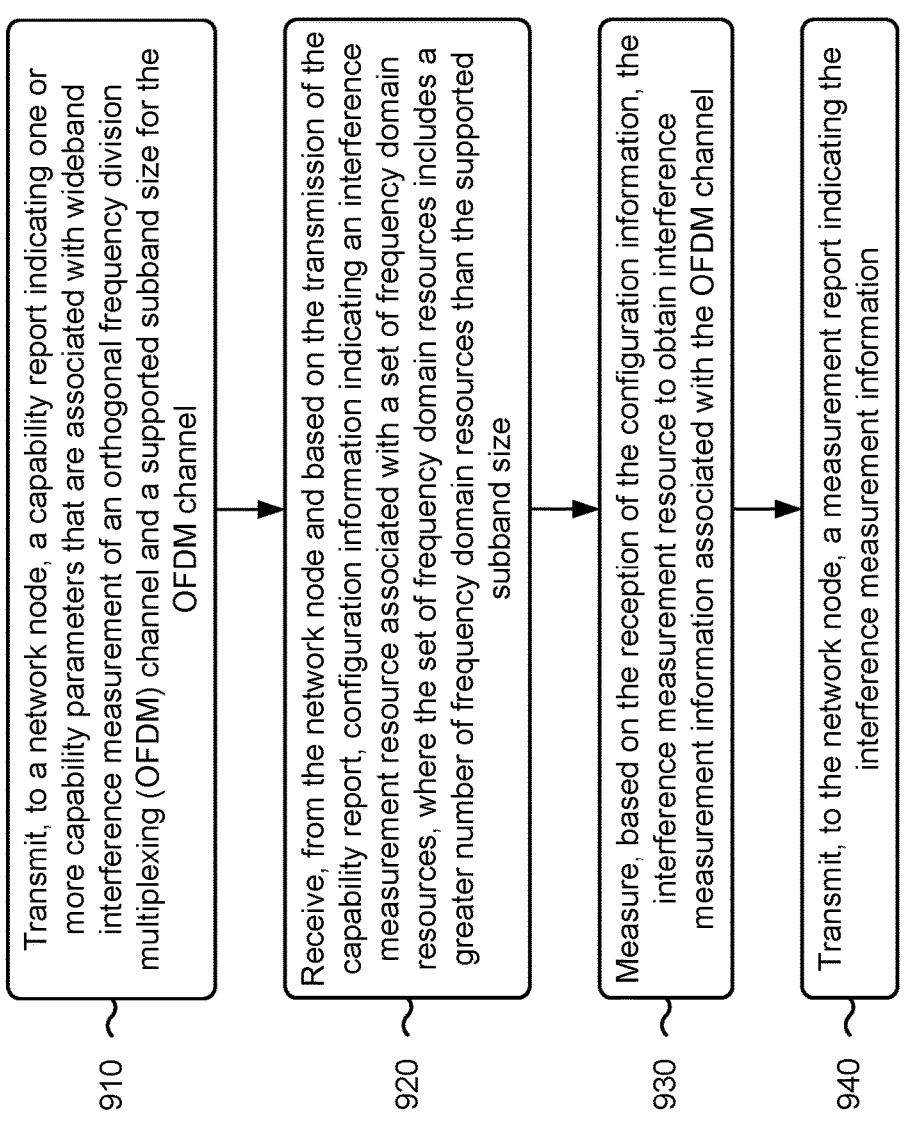

910 — Transmit, to a network node, a capability report indicating one or more capability parameters that are associated with wideband interference measurement of an orthogonal frequency division multiplexing (OFDM) channel and a supported subband size for the OFDM channel 920 — Receive, from the network node and based on the transmission of the capability report, configuration information indicating an interference measurement resource associated with a set of frequency domain resources, where the set of frequency domain resources includes a greater number of frequency domain resources than the supported subband size 930 — Measure, based on the reception of the configuration information, the interference measurement resource to obtain interference measurement information associated with the OFDM channel 940 — Transmit, to the network node, a measurement report indicating the interference measurement information

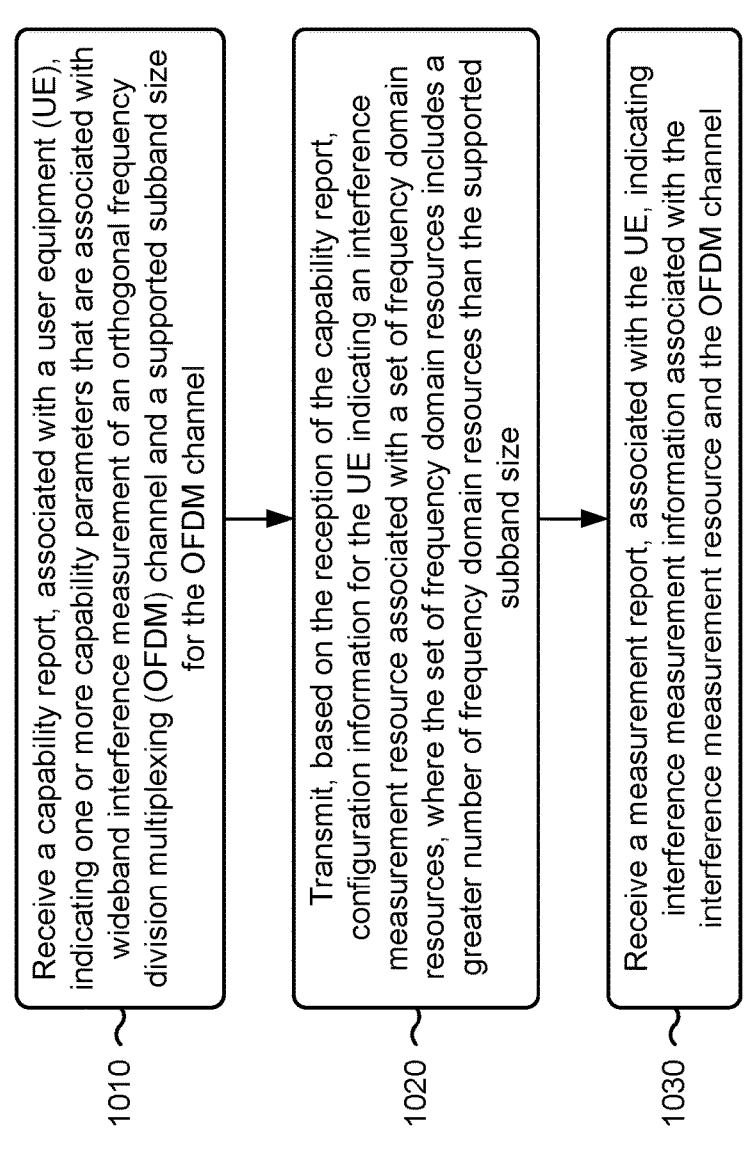

1010 — Receive a capability report, associated with a user equipment (UE), indicating one or more capability parameters that are associated with wideband interference measurement of an orthogonal frequency division multiplexing (OFDM) channel and a supported subband size for the OFDM channel 1020 — Transmit, based on the reception of the capability report, configuration information for the UE indicating an interference measurement resource associated with a set of frequency domain resources, where the set of frequency domain resources includes a greater number of frequency domain resources than the supported subband size 1030 — Receive a measurement report, associated with the UE, indicating interference measurement information associated with the interference measurement resource and the OFDM channel

TECHNIQUES FOR WIDEBAND INTERFERENCE MEASUREMENTS

FIELD OF THE DISCLOSURE

Aspects of the present disclosure generally relate to wireless communication and to techniques and apparatuses for wideband interference measurements.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include transmitting, to a network node, a capability report indicating one or more capability parameters that are associated with wideband interference measurement of an orthogonal frequency division multiplexing (OFDM) channel and a supported subband size for the OFDM channel. The method may include receiving, from the network node and based on the transmission of the capability report, configuration information indicating an interference measurement resource associated with a set of frequency domain resources, wherein the set of frequency domain resources includes a greater number of frequency domain resources than the supported subband size. The method may include measuring, based on the reception of the configuration information, the interference measurement resource to obtain interference measurement information associated with the OFDM channel. The method may include transmitting, to the network node, a measurement report indicating the interference measurement information.

Some aspects described herein relate to a method of wireless communication performed by a network node. The method may include receiving a capability report, associated with a UE, indicating one or more capability parameters that are associated with wideband interference measurement of an OFDM channel and a supported subband size for the OFDM channel. The method may include transmitting, based on the reception of the capability report, configuration information for the UE indicating an interference measurement resource associated with a set of frequency domain resources, wherein the set of frequency domain resources includes a greater number of frequency domain resources than the supported subband size. The method may include receiving a measurement report, associated with the UE, indicating interference measurement information associated with the interference measurement resource and the OFDM channel.

Some aspects described herein relate to a UE for wireless communication. The UE may include one or more memories and one or more processors coupled to the one or more memories. The one or more processors may be individually or collectively configured to cause the UE to transmit, to a network node, a capability report indicating one or more capability parameters that are associated with wideband interference measurement of an OFDM channel and a supported subband size for the OFDM channel. The one or more processors may be individually or collectively configured to cause the UE to receive, from the network node and based on the transmission of the capability report, configuration information indicating an interference measurement resource associated with a set of frequency domain resources, wherein the set of frequency domain resources includes a greater number of frequency domain resources than the supported subband size. The one or more processors may be individually or collectively configured to cause the UE to measure, based on the reception of the configuration information, the interference measurement resource to obtain interference measurement information associated with the OFDM channel. The one or more processors may be configured to cause the UE to transmit, to the network node, a measurement report indicating the interference measurement information.

Some aspects described herein relate to a network node for wireless communication. The network node may include one or more memories and one or more processors coupled to the one or more memories. The one or more processors may be individually or collectively configured to cause the network node to receive a capability report, associated with a UE, indicating one or more capability parameters that are associated with wideband interference measurement of an OFDM channel and a supported subband size for the OFDM channel. The one or more processors may be individually or collectively configured to cause the network node to transmit, based on the reception of the capability report, configuration information for the UE indicating an interference measurement resource associated with a set of frequency domain resources, wherein the set of frequency domain resources includes a greater number of frequency domain resources than the supported subband size. The one or more processors may be individually or collectively configured to cause the network node to receive a measurement report, associated with the UE, indicating interference measurement information associated with the interference measurement resource and the OFDM channel.

Some aspects described herein relate to a non-transitory computer-readable medium that stores a set of instructions for wireless communication by a UE. The set of instructions, when executed by one or more processors of the UE, may cause the UE to transmit, to a network node, a capability report indicating one or more capability parameters that are associated with wideband interference measurement of an OFDM channel and a supported subband size for the OFDM channel. The set of instructions, when executed by one or more processors of the UE, may cause the UE to receive, from the network node and based on the transmission of the capability report, configuration information indicating an interference measurement resource associated with a set of frequency domain resources, wherein the set of frequency domain resources includes a greater number of frequency domain resources than the supported subband size. The set of instructions, when executed by one or more processors of the UE, may cause the UE to measure, based on the reception of the configuration information, the interference measurement resource to obtain interference measurement information associated with the OFDM channel. The set of instructions, when executed by one or more processors of the UE, may cause the UE to transmit, to the network node, a measurement report indicating the interference measurement information.

Some aspects described herein relate to a non-transitory computer-readable medium that stores a set of instructions for wireless communication by a network node. The set of instructions, when executed by one or more processors of the network node, may cause the network node to receive a capability report, associated with a UE, indicating one or more capability parameters that are associated with wideband interference measurement of an OFDM channel and a supported subband size for the OFDM channel. The set of instructions, when executed by one or more processors of the network node, may cause the network node to transmit, based on the reception of the capability report, configuration information for the UE indicating an interference measurement resource associated with a set of frequency domain resources, wherein the set of frequency domain resources includes a greater number of frequency domain resources than the supported subband size. The set of instructions, when executed by one or more processors of the network node, may cause the network node to receive a measurement report, associated with the UE, indicating interference measurement information associated with the interference measurement resource and the OFDM channel.

Some aspects described herein relate to an apparatus for wireless communication. The apparatus may include means for transmitting, to a network node, a capability report indicating one or more capability parameters that are associated with wideband interference measurement of an OFDM channel and a supported subband size for the OFDM channel. The apparatus may include means for receiving, from the network node and based on the transmission of the capability report, configuration information indicating an interference measurement resource associated with a set of frequency domain resources, wherein the set of frequency domain resources includes a greater number of frequency domain resources than the supported subband size. The apparatus may include means for measuring, based on the reception of the configuration information, the interference measurement resource to obtain interference measurement information associated with the OFDM channel. The apparatus may include means for transmitting, to the network node, a measurement report indicating the interference measurement information.

Some aspects described herein relate to an apparatus for wireless communication. The apparatus may include means for receiving a capability report, associated with a UE, indicating one or more capability parameters that are associated with wideband interference measurement of an OFDM channel and a supported subband size for the OFDM channel. The apparatus may include means for transmitting, based on the reception of the capability report, configuration information for the UE indicating an interference measurement resource associated with a set of frequency domain resources, wherein the set of frequency domain resources includes a greater number of frequency domain resources than the supported subband size. The apparatus may include means for receiving a measurement report, associated with the UE, indicating interference measurement information associated with the interference measurement resource and the OFDM channel.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a UE, in accordance with the present disclosure.

FIG. 10 is a diagram illustrating an example process performed, for example, by a network node, in accordance with the present disclosure.

DETAILED DESCRIPTION

Figure 1:
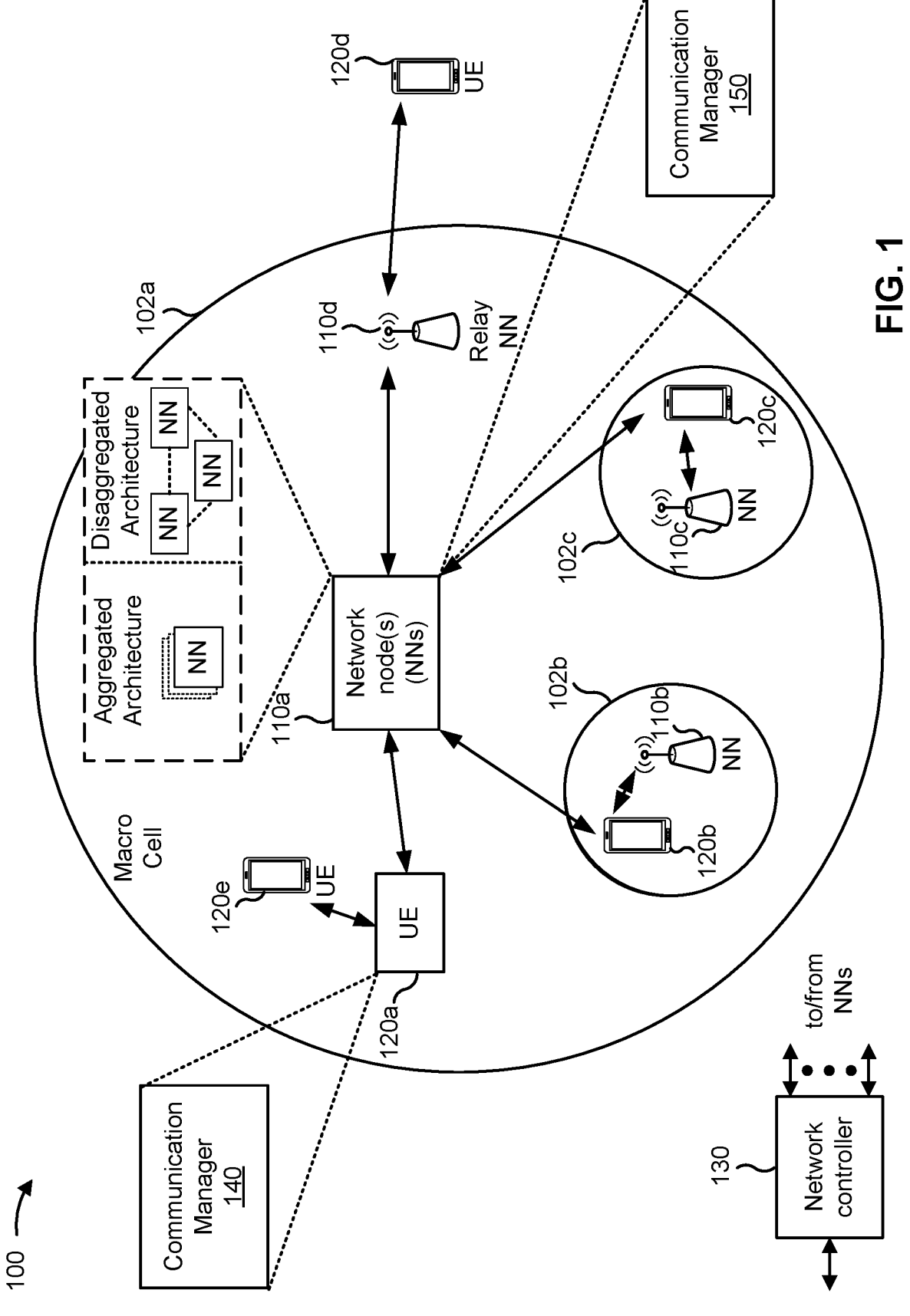
FIG. 1 is a diagram illustrating an example of a wireless network.

In some examples, a user equipment (UE) may estimate an orthogonal frequency division multiplexing (OFDM) channel based on one or more received signals to improve reliability and throughput of transmissions and receptions by the wireless device. The UE may, in some examples, receive an OFDM signal via the OFDM channel. The UE may convert the received analog OFDM signal to a digital signal using an analog-to-digital converter (ADC). The received signal may be a time domain signal. The UE may subsequently perform a fast Fourier transform (FFT) on the time domain digital signal to convert the time domain digital signal to one or more frequency domain signals. The UE may use the frequency domain signals to estimate the OFDM channel in the frequency domain. In some examples, a sampling rate of the ADC at the UE may be relatively high to accurately convert the analog OFDM signals to digital form. Additionally, or alternatively, performing the FFT to convert the time domain signal to a frequency domain be relatively complex.

Therefore, in some cases, the UE may perform OFDM channel estimation using frequency modulated continuous waveform (FMCW) signals. A transmitting device may transmit a first FMCW signal for channel estimation via an OFDM channel. The UE may receive the first FMCW signal and may use a set of FMCW parameters associated with the first FMCW signal to generate a second (e.g., local) FMCW signal. The UE may combine the first and second FMCW signals and may filter the combined signal (e.g., using a low pass filter (LPF), or some other type of filter). The UE may estimate the frequency domain OFDM channel by sampling the combined FMCW signal using a relatively low sampling rate. The sampling rate used by the UE may be based on one or more parameters of the OFDM channel, such as a bandwidth and/or a subband frequency size of the OFDM channel, among other examples.

In some examples, a wireless communication device may measure interference of an OFDM channel. As described above, it may be beneficial to use an analog receiver (e.g., an FMCW-based receiver) for interference measurements of the OFDM channel (e.g., to reduce the ADC sampling rate and/or conserve power) However, interference measurements of an OFDM channel using an analog receiver and/or an FMCW-based receiver may introduce one or more problems (e.g., that may not be present for FMCW-based channel estimation of an OFDM channel). For example, for FMCW-based channel estimation, the transmitting device and the UE may be configured and/or indicated to use one or more parameters for generating an FMCW signal (e.g., for transmission or locally for FMCW-based channel estimation at the receiving device). However, for interference measurements, different devices may transmit different signals using different waveforms and/or different parameters to be measured by the receiving device. For example, to measure the interference of a wireless channel, the receiving device may measure signals transmitted by devices from neighboring cells and/or devices in the same cell that use different waveforms and/or different transmit parameters. Therefore, it may be difficult to identify parameters for which the UE is capable of performing the interference measurements of the OFDM channel using the FMCW-based receiver (e.g., because it may be difficult to predict waveform types and/or parameters of signals measured by a receiving device that uses an analog receiver or an FMCW receiver to measure interference of an OFDM channel).

Various aspects relate generally to wireless communication and more particularly to wideband interference measurements of an OFDM channel. Some aspects more specifically relate to wideband interference measurement of an OFDM channel performed by a UE using an analog receiver and/or an FMCW-based receiver. As used herein, "wideband" interference measurement may refer to a measurement of a interference measurement resource that is associated with a frequency domain range that is greater than a frequency domain range of a narrowband baseband capability of the UE (e.g., a baseband capability for a digital receiver or an OFDM-based receiver of the UE). In some aspects, the UE may transmit, and a network node may receive, a capability report indicating one or more capability parameters of the UE 120 for performing the wideband interference measurements of the OFDM channel.

The one or more capability parameters may enable the network node to configure an interference measurement resource for the UE that enables the UE to perform the wideband interference measurements of the OFDM channel using an FMCW-based receiver (e.g., regardless of transmitting device and/or the waveform type associated with signals causing the interference). For example, the one or more capability parameters may include a supported wideband bandwidth for the wideband interference measurement, a supported ADC sampling rate for the wideband interference measurement, and/or a supported interference measurement granularity for the wideband interference measurement, among other examples.

The network node may transmit, and the UE may receive, configuration information indicating an interference measurement resource associated with a set of frequency domain resources. In some aspects, the set of frequency domain resources include a greater number of frequency domain resources than a supported subband size (e.g., a supported subband size for OFDM communications and/or a supported baseband size). In other words, the interference measurement resource may be a wideband resource. In some aspects, the configuration information may indicate that the UE is to use the analog receiver and/or the FMCW-based receiver to measure interference of the OFDM channel via the interference measurement resource. In other aspects, the UE 120 may determine that the analog receiver and/or the FMCW-based receiver is to be used to measure interference of the OFDM channel via the interference measurement resource based on, in response to, or otherwise associated with the interference measurement resource being a wideband resource. The UE may measure (e.g., using the analog receiver and/or the FMCW-based receiver) the interference measurement resource to obtain interference measurement information associated with the OFDM channel. The UE may transmit, and the network node may receive, a measurement report indicating the interference measurement information.

Particular aspects of the subject matter described in this disclosure can be implemented to realize one or more of the following potential advantages. In some aspects, by measuring interference of the OFDM channel via a wideband interference measurement, the UE may reduce an ADC sampling rate used to measure the interference and/or conserve power associated with performing the interference measurement of the OFDM channel. For example, by using the analog receiver and/or the FMCW-based receiver, the UE 120 may perform interference measurements for the OFDM channel while also conserving processing resources and/or power resources, among other examples.

In some aspects, by transmitting the capability report, the UE may be configured with a wideband interference measurement resource that enables the UE to measure interference of the OFDM channel (e.g., using the analog receiver and/or the FMCW-based receiver) regardless of a transmitting device and/or a waveform type of signals that cause the interference. For example, there may be a relationship between wideband bandwidth, ADC sampling rate, and subband granularity of measurements. By the UE reporting the supported wideband bandwidth, the supported ADC sampling rate, and the supported granularity for the wideband interference measurements, the network node may ensure that the configured interference measurement resource and/or a measurement reporting granularity that is configured by the UE is actually supported by the UE (e.g., regardless of transmitting device and/or the waveform type associated with signals causing the interference).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, an unmanned aerial vehicle, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit, to a network node, a capability report indicating one or more capability parameters that are associated with wideband interference measurement of an OFDM channel and a supported subband size for the OFDM channel; receive, from the network node and based on the transmission of the capability report, configuration information indicating an interference measurement resource associated with a set of frequency domain resources, wherein the set of frequency domain resources includes a greater number of frequency domain resources than the supported subband size; measure, based on the reception of the configuration information, the interference measurement resource to obtain interference measurement information associated with the OFDM channel; and transmit, to the network node, a measurement report indicating the interference measurement information. Additionally, or alternatively, the communication manager 140 may perform one or more other operations described herein.

In some aspects, the network node 110 may include a communication manager 150. As described in more detail elsewhere herein, the communication manager 150 may receive a capability report, associated with a UE, indicating one or more capability parameters that are associated with wideband interference measurement of an OFDM channel and a supported subband size for the OFDM channel; transmit, based on the reception of the capability report, configuration information for the UE indicating an interference measurement resource associated with a set of frequency domain resources, wherein the set of frequency domain resources includes a greater number of frequency domain resources than the supported subband size; and receive a measurement report, associated with the UE, indicating interference measurement information associated with the interference measurement resource and the OFDM channel. Additionally, or alternatively, the communication manager 150 may perform one or more other operations described herein.

As indicated above, FIG. 1 is provided as an example. Other examples may differ from what is described with regard to FIG. 1.

Figure 2:
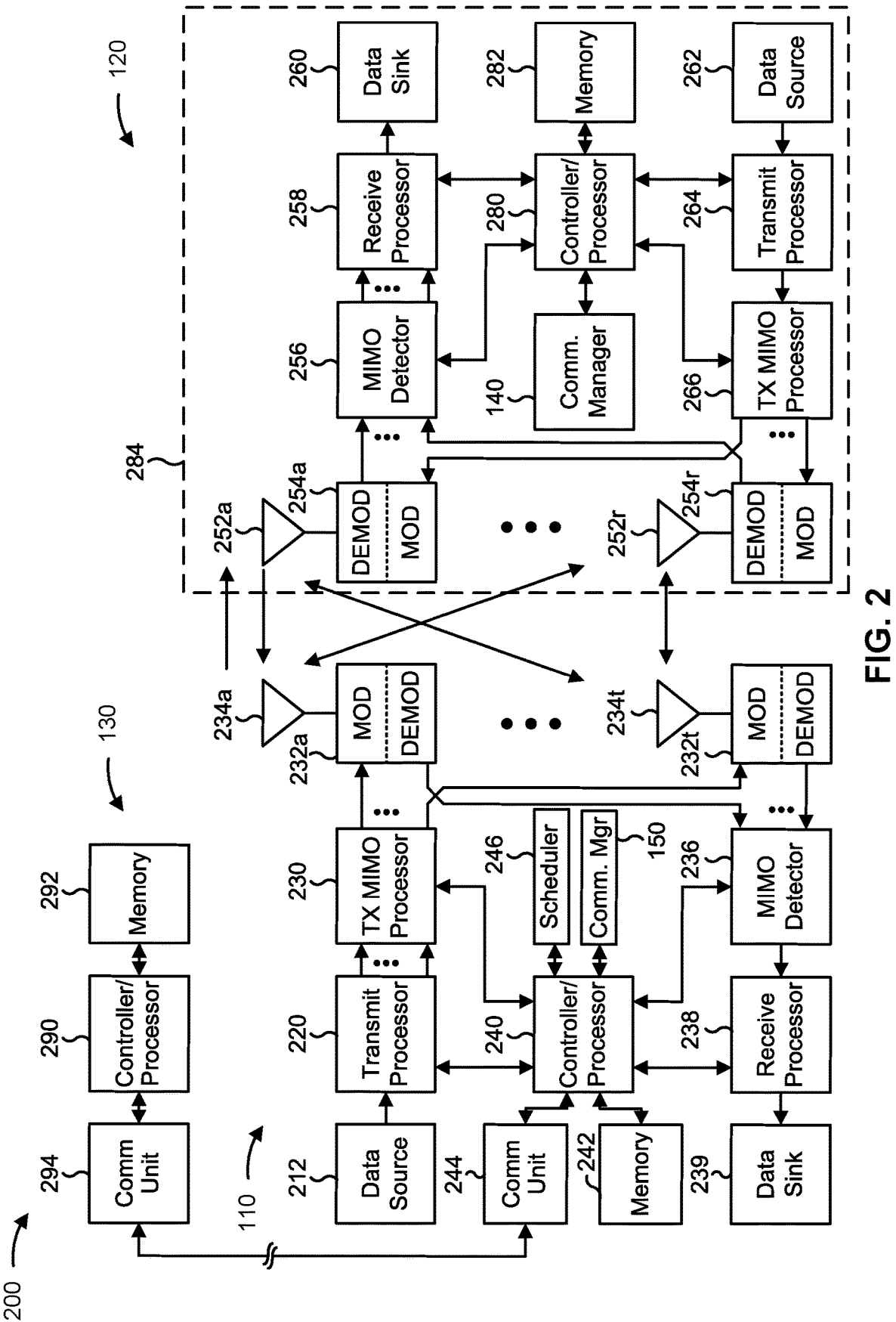
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 7-12).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 7-12).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with wideband interference measurements, as described in more detail elsewhere herein. For example, the controller/processor 240 of the network node 110, the controller/processor 280 of the UE 120, or any other component(s) (or combinations of components) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for transmitting, to a network node, a capability report indicating one or more capability parameters that are associated with wideband interference measurement of an OFDM channel and a supported subband size for the OFDM channel; means for receiving, from the network node and based on the transmission of the capability report, configuration information indicating an interference measurement resource associated with a set of frequency domain resources, wherein the set of frequency domain resources includes a greater number of frequency domain resources than the supported subband size; means for measuring, based on the reception of the configuration information, the interference measurement resource to obtain interference measurement information associated with the OFDM channel; and/or means for transmitting, to the network node, a measurement report indicating the interference measurement information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving a capability report, associated with a UE, indicating one or more capability parameters that are associated with wideband interference measurement of an OFDM channel and a supported subband size for the OFDM channel; means for transmitting, based on the reception of the capability report, configuration information for the UE indicating an interference measurement resource associated with a set of frequency domain resources, wherein the set of frequency domain resources includes a greater number of frequency domain resources than the supported subband size; and/or means for receiving a measurement report, associated with the UE, indicating interference measurement information associated with the interference measurement resource and the OFDM channel. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU). As used herein, the network node 110 "outputting" or "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU outputting or transmitting a communication to an RU and the RU transmitting the communication to the UE 120, or may include causing the RU to transmit the communication (e.g., triggering transmission of a physical layer reference signal). Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. Similarly, the network node 110 "obtaining" a communication may refer to receiving a transmission carrying the communication directly (for example, from the UE 120 to the network node 110) or receiving the communication (or information derived from reception of the communication) via one or more other network nodes or devices.

Figure 3:
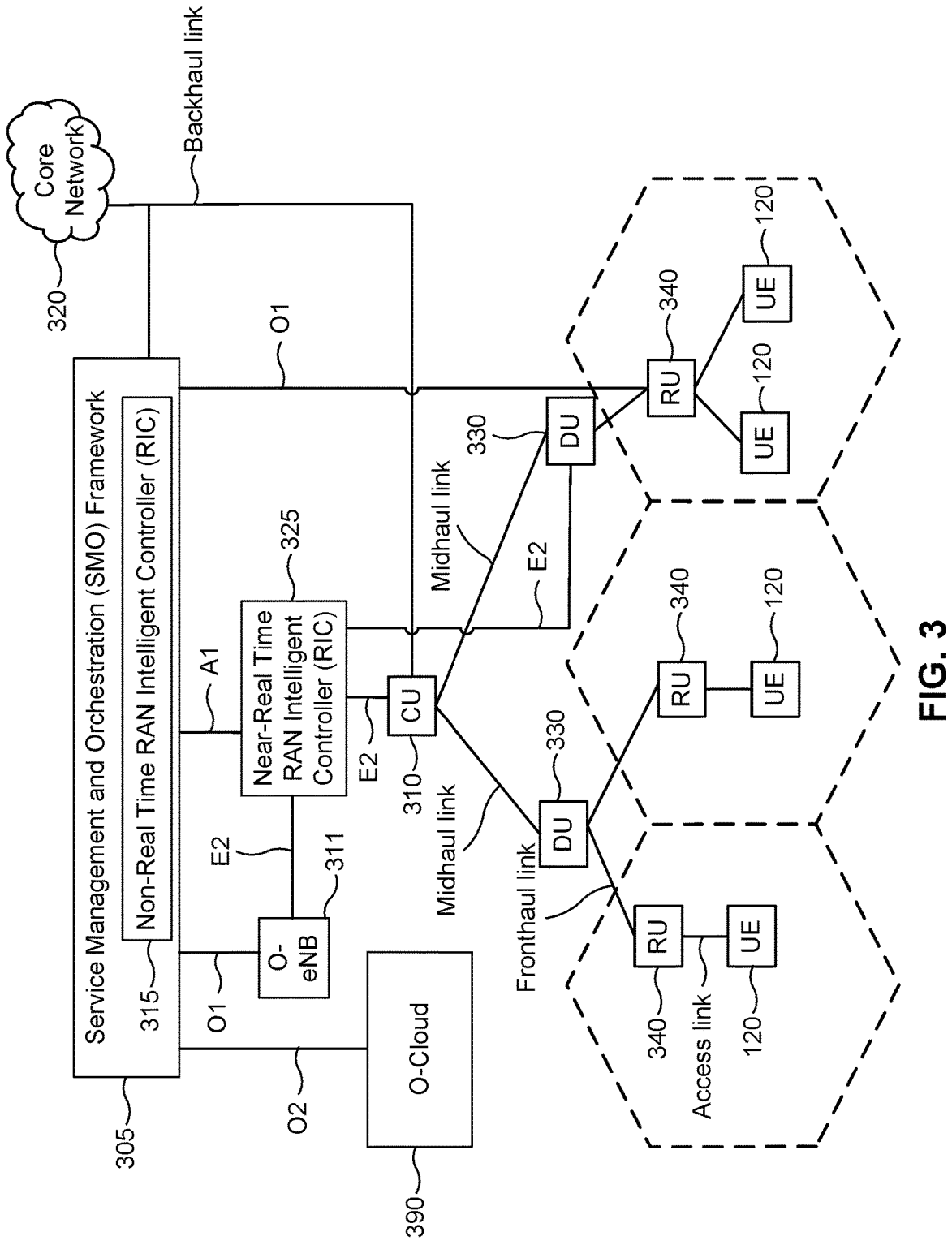
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for an FFT, an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
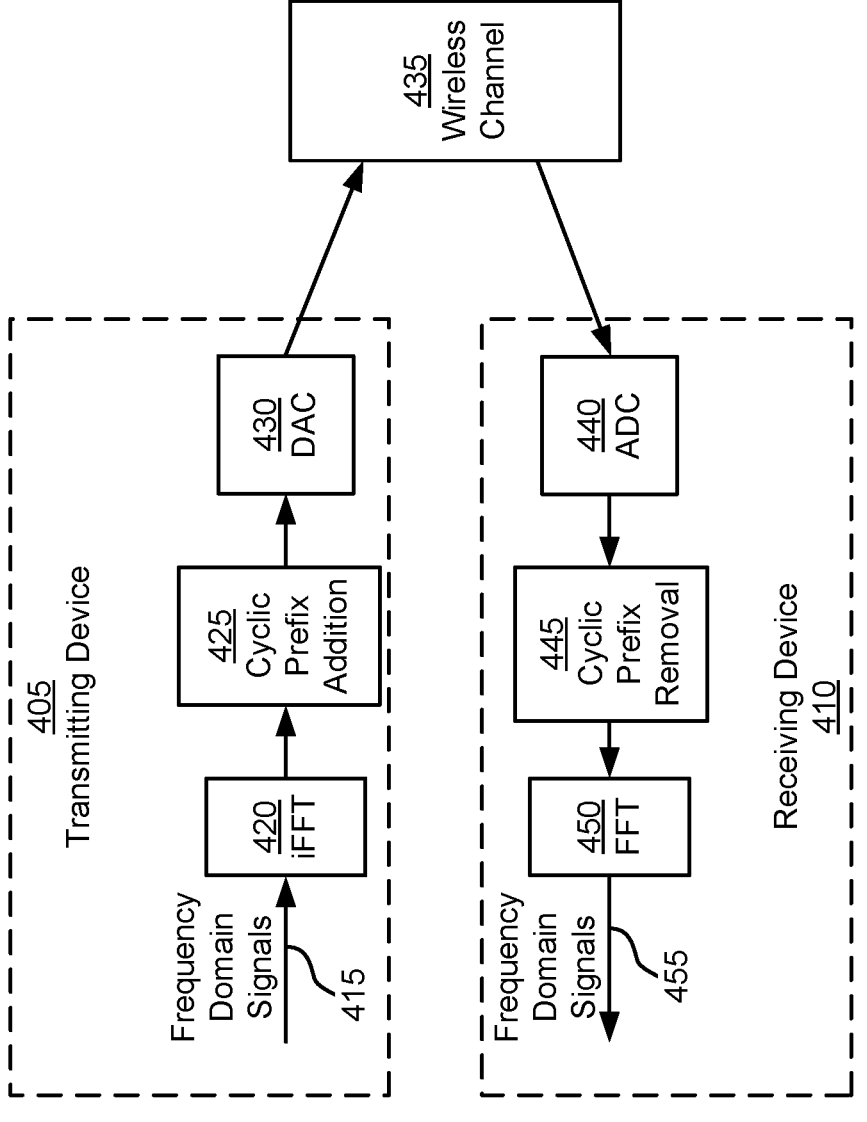
FIG. 4 is a diagram of an example associated with orthogonal frequency division multiplexing (OFDM) channel measurements, in accordance with the present disclosure.

FIG. 4 is a diagram of an example 400 associated with OFDM channel measurements, in accordance with the present disclosure. In some examples, an OFDM channel estimation scheme may implement aspects described in connection with FIGS. 1-5. As shown in FIG. 4, a transmitting device 405 (e.g., a network node 110, a UE 120, a base station, an RU, a DU, a CU, and/or an IAB node) and a receiving device 410 (e.g., a network node 110, a UE 120, a base station, an RU, a DU, a CU, and/or an IAB node) may exchange OFDM signals via a wireless channel 435, which may be an OFDM channel. The receiving device 410 may measure the wireless channel 435 using frequency domain signal processing. The measurements performed by the receiving device 410 (e.g., of the wireless channel 435) may be channel estimation measurements and/or interference measurements.

The transmitting device 405 and the receiving device 410 may establish a connection for wireless communications via the wireless channel 435. The transmitting device 405 may generate an OFDM signal for transmission to the receiving device 410 via the wireless channel 435. To generate the OFDM signal, the transmitting device 405 may identify data scheduled for transmission to the receiving device 410. The data may include or be converted to a set of frequency domain signals 415 (e.g., {X(0),X(1), . . . X(N_c−1)}). The transmitting device 405 may perform an iFFT 420 on the frequency domain signals 415 to convert the frequency domain signals 415 to a time domain signal (e.g., X(m)).

The transmitting device 405 may perform cyclic prefix addition 425 to the time domain signal. For example, the transmitting device 405 may add a cyclic prefix to the time domain signal to generate an OFDM signal. The transmitting device 405 may subsequently use a digital-to-analog converter (DAC) 430 to convert the time domain signal from a digital signal to an analog signal. In some examples, the transmitting device 405 may convert a real and imaginary portion of the digital time domain signal to the analog domain separately. The transmitting device 405 may transmit the analog time domain OFDM signal to the receiving device 410 via the wireless channel 435. In other examples, the transmitting device 405 may not transmit a signal via the wireless channel 435 during an interference measurement resource (e.g., a configured time domain and/or frequency domain allocation) and the receiving device 410 may measure the interference measurement resource, in a similar manner as described below, to perform an interference measurement of the wireless channel 435.

The receiving device 410 may receive the analog time domain OFDM signal (the signal transmitted by the transmitting device 405 and/or an interference signal) and use an ADC 440 at the receiving device 410 to convert the received signal to a digital domain. In some examples, the receiving device 410 may convert a real portion and an imaginary portion of the analog signal to the digital domain separately. The receiving device 410 may perform cyclic prefix removal 445 to remove the cyclic prefix(es) from the time domain digital signal after using the ADC 440. After removing the cyclic prefixes, the receiving device 410 may perform FFT 450 on the digital time domain signal. The FFT 450 may convert the time domain signal to a frequency domain. That is, the FFT 450 may produce a set of frequency domain signals 455.

The receiving device 410 may use the set of frequency domain signals 455 produced by the FFT 450 to estimate a frequency domain OFDM channel (e.g., a frequency domain of the wireless channel 435). In some examples, to estimate a frequency domain OFDM channel based on OFDM signals, the ADC 440 at the receiving device 410 may be a relatively high-rate ADC 440. That is, a sampling rate of the ADC 440 may be relatively high to accurately convert the analog OFDM signals to digital OFDM signals. The sampling rate may be defined in unites of mega-samples per second (Msps). The sampling rate may be calculated based on the subcarrier spacing (SCS) value and a respective FFT size and may be associated with a respective number of subcarriers (sc) (e.g., in quantities of physical resource blocks (PRBs)). For example, the sampling rate may be equal to a product of the SCS and the FFT size (NFFT) (e.g., 15 KHz*2048=30.72 MHz).

In some examples, performing the FFT 450 by the receiving device 410 may be associated with relatively high processing and complexity. Additionally, or alternatively, the ADC 440 at the receiving device 410 may be a relatively high rate ADC 440. A sampling rate used to convert the received analog signal to digital form may be relatively high for the receiving device 410 to accurately convert OFDM signals and subsequently perform FFT 450.

As indicated above, FIG. 4 is provided as an example. Other examples may differ from what is described with regard to FIG. 4.

Figure 5:
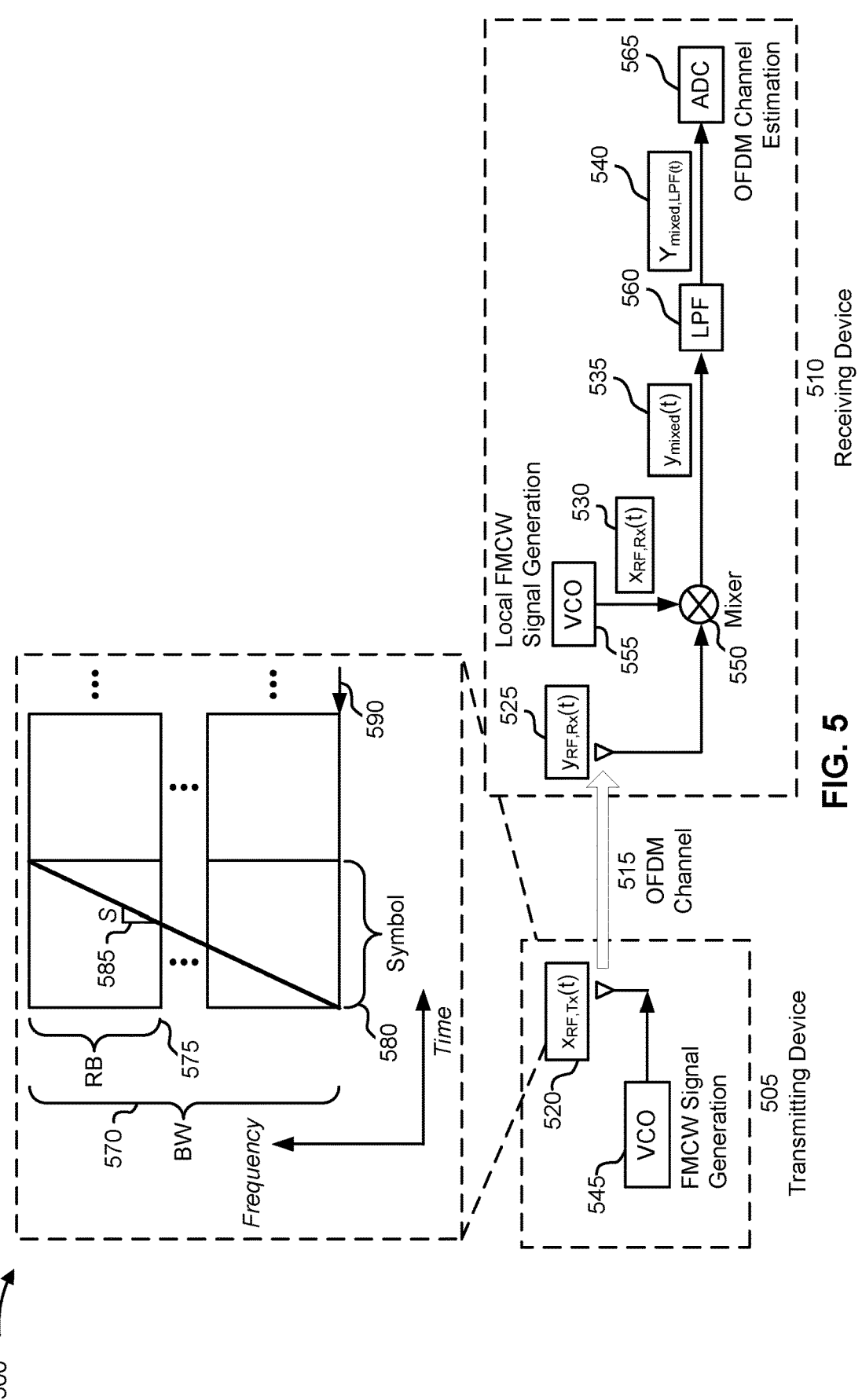
FIG. 5 is a diagram of an example associated with frequency modulated continuous waveform (FMCW)-based channel estimation of an OFDM channel, in accordance with the present disclosure.

FIG. 5 is a diagram of an example 500 associated with FMCW-based channel estimation of an OFDM channel, in accordance with the present disclosure.

In some examples, an FMCW-based channel estimation scheme may implement aspects described in connection with FIGS. 1-4. As shown in FIG. 5, a transmitting device 505 (e.g., a network node 110, a UE 120, a base station, an RU, a DU, a CU, and/or an IAB node) and a receiving device 510 (e.g., a network node 110, a UE 120, a base station, an RU, a DU, a CU, and/or an IAB node) may exchange an FMCW signal via an OFDM channel 515. The FMCW signal may be used to facilitate channel estimation of the frequency domain OFDM channel by the receiving device 510. An FMCW signal may also be referred to as an "FMCW chirp."

In some examples, FMCW-based channel estimation of an OFDM channel may be used to mitigate one or more (or all) of the problems described above. For example, the transmitting device 505 and the receiving device 510 may exchange FMCW signals via the wireless channel 435. The FMCW signals may be configured for channel estimation of the OFDM channel 515, and may support reduced processing complexity at the receiving device 510. For example, the FMCW signals may be sampled at a reduced sampling rate as compared to OFDM signals, and may be used to estimate the frequency domain OFDM channel using time domain signal processing, such that the receiving device 510 may refrain from performing an FFT (e.g., a frequency-domain OFDM channel can be estimated directly via time-domain signaling processing without performing an FFT), which may reduce complexity as compared with using OFDM signals to estimate OFDM channels.

The transmitting device 505 and the receiving device 510 may establish a connection for wireless communications via an OFDM channel 515. In some examples, the devices may exchange one or more capability messages, control messages, or both to initiate an FMCW-based OFDM channel estimation procedure described herein. After the FMCW-based OFDM channel estimation procedure is initiated, the transmitting device 505 may generate an FMCW signal 520 (e.g., a first FMCW signal). In some examples, the transmitting device 505 may generate the FMCW signal 520 in an analog domain using a voltage controlled oscillator (VCO) 545. The transmitting device 505 may transmit the FMCW signal 520 via the OFDM channel 515 using at least one antenna element at the transmitting device 505. In some aspects, the VCO 545 and/or the at least one antenna element may be included in one or more communication interfaces of the transmitting device 505. The analog domain FMCW signal 520 generated and transmitted by the transmitting device 505 may be represented by $x_{RF,Tx}(t)$, shown in Equation 1.

$$x_{RF,Tx}(t) = \cos\left(2\pi\left(f_c + \frac{S}{2}t\right)t + \phi_{Tx}\right) \tag{1}$$

As shown in Equation 1, the FMCW signal 520 may be a time-domain signal (e.g., a function of time (t)). In the example of Equation 1, $f_c$ may represent a starting frequency 590 of the FMCW signal 520, S may represent a slope 585 of the FMCW signal 520, and $\phi_{Tx}$ may represent a phase of the transmitting device 505.

As shown in FIG. 5, the FMCW signal 520 may be associated with a waveform signal transmitted via a symbol 580 of the OFDM channel 515 in the time domain and a bandwidth 570 (e.g., BW) of the OFDM channel 515 in the frequency domain (e.g., the FMCW signal 520 may be a wideband signal). The bandwidth 570 may include one or more resource blocks 575 in the frequency domain. In some examples, each resource block 575 may include a set of resource elements in the frequency domain. The OFDM channel 515 may include one or more symbols 580 in the time domain. A duration or length of each symbol 580 may correspond to a length of an OFDM symbol, or a length of an OFDM symbol and a respective cyclic prefix duration, or a partial length of an OFDM symbol, or a partial length of an OFDM symbol and a respective cyclic prefix duration, or some other length longer than the length of the OFDM symbol and the length of the OFDM symbol and cyclic prefix duration, or some other symbol duration, or any combination thereof. The FMCW signal 520 may span frequencies between the starting frequency 590 and a sum of the starting frequency 590 and the bandwidth 570 (e.g., $\{f_c, f_c+BW\}$).

An FMCW signal 525 (e.g., a radio frequency signal) that is received by the receiving device 510 via the OFDM channel 515 in response to the FMCW signal 520 transmitted by the transmitting device 505 may be represented by $y_{RF,Rx}(t)$, shown in Equation 2.

$$y_{RF,Rx}(t) = \sum_{p=0}^{P-1} A_p x_{RF,Tx}(t - \tau_p) + n(t) = \qquad (2)$$
$$\sum_{p=0}^{P-1} A_p \cos\left(2\pi\left(f_c + \frac{S}{2}(t - \tau_p)\right)(t - \tau_p) + \phi_{Tx}\right) + n(t)$$

In the example of Equation 2, P may represent a number of channel delay paths (e.g., a number of multi-paths) associated with the OFDM channel 515, and $\tau_p$ may represent a given channel delay with index p. That is, the FMCW signal 525 may be sampled over various channel delays (e.g., p=0 to P−1). $A_p$ may represent conditions of the OFDM channel 515 and n(t) may represent channel noise. In some examples, the channel noise may be associated with a relatively small value relative to the other values that define the radio frequency FMCW signal 525 that is received by the receiving device 510 in Equation 2.

As described herein, the receiving device 510 may generate an FMCW signal 530 at the receiving device 510. The FMCW signal 530 generated at the receiving device 510 may be referred to as a second FMCW signal or a local FMCW signal. The receiving device 510 may generate the FMCW signal 530 in the analog domain using a VCO 555 at the receiving device 510. The receiving device 510 may generate the FMCW signal 530 at the same time as or after receiving the FMCW signal 525. The FMCW signal 530 generated by the receiving device 510 may be represented by $x_{RF,Rx}(t)$, shown in Equation 3.

$$x_{RF,Rx}(t) = \exp\left(-j\left(2\pi\left(f_c + \frac{S}{2}t\right)t - \phi_{Rx}\right)\right) \qquad (3)$$

As shown in Equation 3, the receiving device 510 may generate the FMCW signal 530 based on a set of FMCW parameters associated with the FMCW signal 520 transmitted by the transmitting device 505. The set of FMCW parameters may include, for example, the starting frequency 590 ($f_c$) of the FMCW signal 520, the slope 585 (S) of the FMCW signal 520, and/or an initial phase of a transmitting device (e.g., $\phi_{Tx}$), among other examples. That is, the FMCW signal 530 generated by the receiving device 510 may have a same starting frequency 590 and slope 585 as the FMCW signal 520 generated by the transmitting device 505. In the example of Equation 3, $\phi_{Rx}$ may represent a phase of the receiving device 510. In some examples, the phase of the receiving device 510 may be the same as the phase of the transmitting device 505 (e.g., $\phi_{Tx}=\phi_{Rx}$).

The FMCW signal 520 transmitted by the transmitting device 505 and the FMCW signal 530 generated at the receiving device 510 may have similar FMCW structures. For example, both signals (e.g., the FMCW signal 520 and the FMCW signal 530) may be wideband signals (e.g., may span a full bandwidth 570 of the OFDM channel 515), may span a duration of a symbol 580 in the OFDM channel 515, may be associated with the starting frequency 590, and may be associated with the slope 585. In some examples, the FMCW signal 520 transmitted by the transmitting device 505 may be a real signal. For example, the FMCW signal 520 may include a single stream (e.g., a cosine stream, as shown in Equation 1). The FMCW signal 530 generated by the receiving device 510 may include two streams (e.g., a sinusoidal stream and a cosine stream) for channel estimation. That is, the exponential function in the FMCW signal 530 generated by the receiving device 510 may be designed for channel estimation. In some examples, the receiving device 510 may be configured with a function for generating the FMCW signal 530 for channel estimation, or the receiving device 510 may receive a control message that indicates the function for generating the FMCW signal 530 for channel estimation.

After generating the FMCW signal 530 configured for channel estimation, the receiving device 510 may generate a combined FMCW signal 535 (e.g., $y_{mixed}(t)$). To generate the combined FMCW signal 535, the receiving device 510 may combine the FMCW signal 525 received at the receiving device 510 with the locally generated FMCW signal 530 using a mixer 550. The mixer 550 may represent an example of one or more components (e.g., hardware, software, or both) of the receiving device 510 that are configured to combine two or more time-domain FMCW signals. In some examples, the combining may include multiplying the FMCW signals (e.g., $y_{mixed}(t)=y_{RF,Rx}(t)x_{RF,Rx}(t)$).

The receiving device 510 may filter the combined FMCW signal 535 using an LPF 560 at the receiving device 510. The LPF 560 may generate a combined and filtered FMCW signal 540 (e.g., $y_{mixed,LPF}(t)$). The LPF 560 may represent an example of a component of the receiving device 510 that is configured to filter signals, and/or a function supported by the receiving device 510. For example, the receiving device 510 may apply an LPF function to the combined FMCW signal 535 (e.g., $y_{mixed,LPF}(t)=LPF[y_{RF,Rx}(t),x_{RF,UE}(t)]$.)

After combining and filtering the FMCW signals, the receiving device 510 may perform frequency domain OFDM channel estimation using time-domain signal processing based on sampling the combined and filtered FMCW signal 540. The receiving device 510 may use an ADC 565 to sample the combined and filtered FMCW signal 540 in the time domain. A sampling rate used to sample the combined and filtered FMCW signal 540 may be based on one or more parameters associated with the OFDM channel 515. For example, the sampling rate may be based on a frequency range of one or more subbands in the OFDM channel 515 (e.g., the sampling rate, $$\frac{1}{T_s},$$

may be equal to an inverse of $$T_s = \frac{1}{F_s} = \frac{f_{subband}}{S}\bigg).$$

The subband frequency range, $f_{subband}$, may represent a granularity at which the receiving device 510 can estimate the OFDM channel 515 in the frequency domain.

The sampling by the receiving device 510 as part of the OFDM channel estimation may produce a sampling sequence, $D_{Rx}(k)$, which may represent a set of values associated with the OFDM channel estimation. The sampling sequence may have a granularity of $f_{subband}$. For example, each value of $D_{Rx}(k)$ may represent an example of an estimated value of a respective frequency subband of the OFDM channel 515.

The receiving device 510 may thereby estimate the frequency domain OFDM channel 515 using time domain signal processing and with a granularity of $f_{subband}$ based on the FMCW signal 525 received at the receiving device 510 and the FMCW signal 530 generated by the receiving device 510. The described FMCW-based OFDM channel estimation techniques may be performed by the receiving device 510 in the time domain using time domain signal processing. That is, the receiving device 510 may refrain from applying FFT or other frequency transforms when using the FMCW signals to estimate the frequency domain OFDM channel 515. By performing the OFDM channel estimation in the time domain, the receiving device 510 may reduce processing complexity, latency, and/or power consumption, among other examples, as compared with other OFDM channel estimation schemes performed at least partially in the frequency domain (e.g., using FFT), such as the OFDM channel estimation scheme described in connection with FIG. 4. Additionally, or alternatively, the receiving device 510 may estimate the frequency domain OFDM channel 515 using both wideband radio frequency processing and narrowband radio frequency processing. For example, the FMCW signal 525 received at the receiving device 510 may be a wideband signal in the radio frequency, and after the LPF 560, the combined and filtered FMCW signal 540 may be a narrowband signal for baseband processing.

The sampling rate used by the receiving device 510 to estimate the frequency domain OFDM channel 515 using FMCW signals may be relatively low. The sampling rate described herein may be based on the slope 585 of the FMCW signals and the frequency granularity $f_{subband}$. For example, the sampling rate may be equal to $$\frac{S}{f_{subband}} = \frac{N_{RE} \cdot \Delta f \cdot \Delta f}{k_{subband} \cdot \Delta f} = \frac{N_{RE} \cdot \Delta f}{k_{subband}},$$

where $k_{subband}$ represents a number of resource elements in each frequency subband (e.g., each sampled portion of the frequency domain OFDM channel 515). A sampling rate of some OFDM channel estimation schemes (e.g., as described with reference to FIG. 6) may be equal to a product of an FFT size, $N_{FFT}$, and an SCS, $\Delta f$ (e.g., $N_{FFT} \cdot \Delta f$). Thus, a ratio of the sampling rate of the FMCW-based OFDM channel estimation described herein relative to the OFDM-based OFDM channel estimation techniques may be represented by $\gamma$, as shown in Equation 4.

$$\gamma = \frac{N_{RE} \cdot \Delta f}{k_{subband} \cdot \Delta f \cdot N_{fft}} = \frac{N_{RE}}{k_{subband} \cdot N_{fft}} \tag{4}$$

As shown by Equation 4, the ratio between the sampling rate of the FMCW-based OFDM channel estimation scheme and the OFDM channel estimation scheme may be relatively low. For example, the sampling rate of the FMCW-based OFDM channel estimation scheme may be relatively low compared to an OFDM-based OFDM channel estimation scheme. In one example, if there are 273*12 resource elements in the bandwidth 570 (e.g., $N_{RE}$=273*12), and each subband includes a single resource element (e.g., $k_{subband}$=1), the ratio, may be equal to 0.8. For example, the FMCW-based OFDM channel estimation techniques may produce an ADC sampling gain of approximately 20 percent. The FMCW-based channel estimation scheme described herein may reduce the sampling rate by a relatively large amount relative to OFDM-based channel estimation. For example, a sampling rate used by the receiving device 510 to estimate the OFDM channel 515 with a granularity of four resource blocks 575 when the channel bandwidth 570 is 50 MHz and using FMCW signals may be approximately 1.69 percent of the sampling rate that may be used by the receiving device 510 if OFDM-based channel estimation is performed in the same scenario.

The FMCW-based OFDM channel estimation described herein may reliably estimate the frequency domain OFDM channel 515 using the reduced sampling rate. For example, an accuracy of the FMCW-based OFDM channel estimation techniques may be relatively similar to an accuracy of OFDM-based OFDM channel estimation techniques using frequency domain reference signals across a range of packet delay protocols, SCS values, and bandwidths when compared with benchmark values. That is, the FMCW-based OFDM channel estimation may maintain or improve accuracy and reliability of estimations of frequency domain OFDM channels 515 while reducing processing and power consumption.

The receiving device 510 may thereby estimate the frequency domain OFDM channel 515 using time domain signal processing and with a granularity based on the FMCW signal 525 received at the receiving device 510 and the FMCW signal 530 generated by the receiving device 510. The described FMCW-based OFDM channel estimation techniques may be performed by the receiving device 510 in the time domain using time domain signal processing. That is, the receiving device 510 may refrain from applying FFT or other frequency transforms when using the FMCW signals to estimate the frequency domain OFDM channel 515. By performing the OFDM channel estimation in the time domain, the receiving device 510 may reduce processing complexity, latency, and power consumption as compared with other OFDM channel estimation techniques performed at least partially in the frequency domain (e.g., using FFT). Additionally, or alternatively, the receiving device 510 may estimate the frequency domain OFDM channel 515 using narrowband radio frequency processing.

That is, the FMCW signal 525 received at the receiving device 510 may be a wideband signal in the radio frequency, and after the LPF 560, the combined and filtered FMCW signal 540 may be a narrowband signal for baseband processing.

In some examples, the receiving device 510 may select one or more bandwidth parts (BWPs) (e.g., BWPs which have a higher channel quality than a BWP configured for the receiving device 510) from the set of BWPs (e.g., of the wideband) associated with the OFDM channel 515 and/or that are included within the bandwidth 570 based on the FMCW-based OFDM channel estimation. For example, using the FMCW-based OFDM channel estimation of the OFDM channel 515, the receiving device 510 may identify one or more BWPs within the bandwidth 570 that are associated with a higher channel quality than other BWPs within the bandwidth 570 (e.g., from a single FMCW signal, such as the FMCW signal 525). The receiving device 510 may transmit, to the transmitting device 505 or a network node 110, an indication of the one or more second BWPs via a report.

The transmitting device 505 or the network node 110 may receive the report and may configure the receiving device 510 to communicate via at least one BWP of the one or more BWPs selected by the receiving device 510. In other words, the transmitting device 505 or the network node 110 may select the at least one BWP from the one or more BWPs indicated via the report. The transmitting device 505 or the network node 110 may transmit, to the receiving device 510, a control signal (e.g., an RRC signal, a MAC control element (MAC-CE) signal, and/or a downlink control information (DCI) signal) indicating the at least one BWP. Accordingly, the receiving device 510 may switch to the at least one BWP (e.g., one or more preferred BWPs).

As indicated above, FIG. 5 is provided as an example. Other examples may differ from what is described with regard to FIG. 5.

Figure 6:
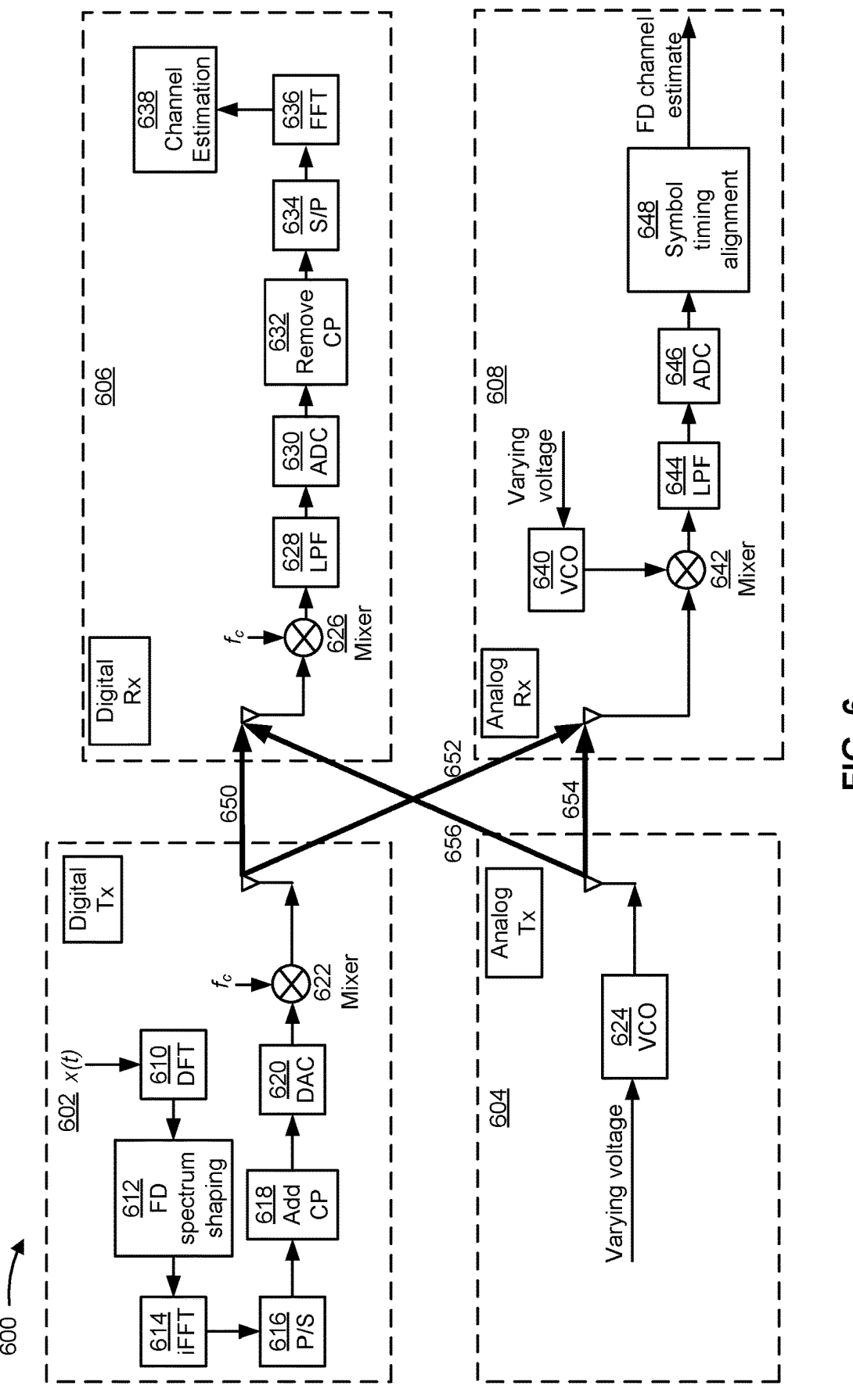
FIG. 6 is a diagram of an example associated with radio frequency architecture for different waveform types, in accordance with the present disclosure.

FIG. 6 is a diagram of an example 600 associated with radio frequency architecture for different waveform types, in accordance with the present disclosure.

As shown in FIG. 6, a wireless communication device (e.g., a UE 120, a network node 110, or another wireless communication device) may include a first transmitter 602, a second transmitter 604, a first receiver 606, and/or a second receiver 608. The first transmitter 602 may be a digital transmitter. A transmitter may be, or may include, a transmit chain. A transmit chain may include one or more radio frequency components (e.g., radio frequency front end (RFFE) components) that are configured to generate and/or transmit a signal. A receiver may be, or may include, a receive chain. A receive chain may include one or more radio frequency components (e.g., RFFE components) that are configured to receive and/or process a received signal. In some examples, "transmitter," "transmit chain," and/or "transmit architecture" may be used interchangeably herein. In some examples, "receiver," "receive chain," and/or "receive architecture" may be used interchangeably herein. In some aspects, one or more components of a transmitter (e.g., the first transmitter 602 and/or the second transmitter 604) may be implemented in transmit processor 264, TX MIMO processor 266, modem 254, and/or controller/processor 280, as described above in connection with FIG. 2. In some aspects, one or more components of a receiver (e.g., the first receiver 606 and/or the second receiver 608) may be implemented in receive processor 258, MIMO detector 256, modem 254, and/or controller/processor 280, as described above in connection with FIG. 2.

The first transmitter 602 may be configured to generate signals using digital domain processing (e.g., may be a digital transmitter). In some examples, the first transmitter 602 may be configured to generate OFDM signals, in a similar manner as described elsewhere herein, such as in connection with FIG. 4. The first transmitter 602 may include a discrete Fourier transform (DFT) component 610, a frequency domain (FD) spectrum shaping component 612, an iFFT component 614, a parallel-to-serial (P/S) converter 616, a cyclic prefix (CP) addition component 618, a DAC 620, and/or a mixer 622, among other examples. For example, a signal x(t) may be input to the DFT component 610 to perform a DFT operation. The FD spectrum shaping component 612 may be configured to obtain N parallel data streams and map the N parallel data streams onto N constellation points. Thus, FD spectrum shaping component 612 may output N parallel symbol streams, each symbol stream corresponding to one of N orthogonal subcarriers of the (iFFT) component 614. These N parallel symbol streams are represented in the frequency domain and may be converted into N parallel time domain sample streams by the iFFT component 614. The N parallel time domain sample streams may be converted into an OFDM symbol stream by the P/S converter 616. The CP addition component 618 may add or insert a CP into each OFDM symbol stream. The DAC 620 may convert the digital OFDM symbol stream into an analog symbol stream. The analog symbol stream may be upconverted to a desired transmit frequency ($f_c$) band by an RFFE (e.g., via the mixer 622). One or more antennas may transmit the resulting signal (e.g., a wideband signal and/or an OFDM signal).

The second transmitter 604 may be configured to generate signals using analog domain processing (e.g., the second transmitter 604 may be an analog transmitter). The second transmitter 604 may be configured to generate FMCW signals. For example, the second transmitter 604 may generate a signal in a similar manner as the transmitting device 505 described in connection with FIG. 5 (e.g., using a VCO 624). One or more antennas may transmit the resulting signal (e.g., a wideband signal or an FMCW signal).

The first receiver 606 may be configured to process received signals in the digital domain (e.g., the first receiver 606 may be a digital receiver). For example, the first receiver 606 may be configured to receive and/or process OFDM signals. The first receiver 606 may include a mixer 626, an LPF 628, an ADC 630, a CP removal component 632, a serial-to-parallel (S/P) converter 634, an FFT component 636, and/or a channel estimation component 638, among other examples. A signal may be received by one or more antennas of the first receiver 606. The received signal may be downconverted to a baseband signal by an RFFE (e.g., via the mixer 626, the LPF 628, and/or the ADC 630). A CP may be removed from the received signal via the CP removal component 632. The baseband signal may be provided to the S/P converter 634. For example, the baseband signal may include an OFDM symbol stream and the S/P converter 634 may divide the OFDM symbol stream into N parallel time-domain symbol streams. Each of the N parallel time-domain symbol streams may correspond to one of the N orthogonal subcarriers. The FFT component 636 may convert the N parallel time-domain symbol streams into the frequency domain and output N parallel frequency domain symbol streams. The channel estimation component 638 may use the frequency domain symbol streams to perform channel estimation for a wireless channel, in a similar manner as described elsewhere herein, such as in connection with FIG. 4.

The second receiver 608 may be configured to process received signals in the analog domain (e.g., the second receiver 608 may be an analog receiver). For example, the second receiver 608 may be configured to receive and/or process FMCW signals (e.g., the second receiver 608 may be an FMCW receiver), in a similar manner as described elsewhere herein, such as in connection with FIG. 5 and the receiving device 510. For example, the second receiver 608 may include a VCO 640 (e.g., configured to generate a local FMCW signal), a mixer 642 (e.g., for combining the received signal and the local FMCW signal), an LPF 644, an ADC 646, and/or a symbol timing alignment component 648, among other examples. After combining and filtering the signals, the second receiver 608 may perform frequency domain OFDM channel estimation using time-domain signal processing based on sampling the combined and filtered signal. The second receiver 608 may use the ADC 646 to sample the combined and filtered signal in the time domain.

As shown in FIG. 6, in some examples, a transmitter (e.g., the first transmitter 602 or the second transmitter 604) may transmit a signal via a wireless channel and a receiver (e.g., the first receiver 606 or the second receiver 608) may receive the signal via the wireless channel. For example, as shown by reference number 650, the first transmitter 602 may transmit, and the first receiver 606 may receive, a signal via a wireless channel. As another example, as shown by reference number 652, the first transmitter 602 may transmit, and the second receiver 608 may receive, a signal via a wireless channel. This example may conserve processing overhead for downlink signals (e.g., enabling a network node 110 to use a digital transmitter while enabling a UE 120 to use the second receiver 608 to conserve processing resources and/or power resources). As another example, as shown by reference number 654, the second transmitter 604 may transmit, and the second receiver 608 may receive, a signal via a wireless channel. This example may conserve processing overhead for sensing operations (e.g., enabling both a transmitting device and receiving device to conserve processing resources and/or power resources using analog domain and/or time domain processing of signals). As another example, as shown by reference number 656, the second transmitter 604 may transmit, and the first receiver 606 may receive, a signal via a wireless channel. This example may conserve processing overhead for uplink signals (e.g., enabling a network node 110 to use a digital receiver while enabling a UE 120 to use the second transmitter 604 to conserve processing resources and/or power resources).

In some examples, a wireless communication device may include one of the first transmitter 602 or the second transmitter 604. In other examples, a wireless communication device may include both the first transmitter 602 and the second transmitter 604. In such examples, the wireless communication device may be capable of switching between transmitting signals using the first transmitter 602 and transmitting signals using the second transmitter 604. In some examples, a wireless communication device may one of the first receiver 606 or the second receiver 608. In other examples, a wireless communication device may include both the first receiver 606 and the second receiver 608. In such examples, the wireless communication device may be capable of switching between receiving signals using the first receiver 606 and receiving signals using the second receiver 608.

As described elsewhere herein, the second receiver 608 may use a lower sampling rate than the first receiver 606. For example, for a 100 MHz bandwidth and an SCS of 30 KHz, a number of samples for each symbol may be 4,096 (e.g., for the first receiver 606). This may result in the first receiver 606 using a sampling rate (e.g., for the ADC 630) of 122.88 MHz. However, in the same scenario, the second receiver 608 may use a sampling rate (e.g., for the ADC 646) of 8.19 MHz (e.g., assuming a channel estimation granularity of one (1) resource block). As another example, for a 400 MHz bandwidth and an SCS of 30 KHz, a number of samples for each symbol may be 16,384 (e.g., for the first receiver 606). This may result in the first receiver 606 using a sampling rate of 491.52 MHz. However, in the same scenario, the second receiver 608 may use a sampling rate of 32.76 MHz. As another example, for a 400 MHz bandwidth and an SCS of 120 KHz, a number of samples for each symbol may be 4,096 (e.g., for the first receiver 606). This may result in the first receiver 606 using a sampling rate of 491.52 MHz. However, in the same scenario, the second receiver 608 may use a sampling rate of 32.76 MHz. As another example, for a 1600 MHz bandwidth and an SCS of 120 KHz, a number of samples for each symbol may be 16,384 (e.g., for the first receiver 606). This may result in the first receiver 606 using a sampling rate of 1966.08 MHz. However, in the same scenario, the second receiver 608 may use a sampling rate of 131.04 MHz. In some cases, the second receiver 608 may be enabled to use a sampling rate (e.g., for the ADC 646) that is approximately 6.67% of the sampling rate used by the first receiver 606 (e.g., for the ADC 630). As a result, measuring a wireless channel using the second receiver 608 may conserve power resources for a wireless communication device compared to measuring the wireless channel using the first receiver 606.

For example, it may be beneficial to measure the wireless channel in a similar manner as described in connection with FIG. 5 (e.g., describing FMCW-based channel estimation). In some examples, a wireless communication device may measure interference of an OFDM channel using an analog receiver (such as the second receiver 608). However, interference measurements of an OFDM channel using an analog receiver and/or an FMCW-based receiver may introduce one or more problems (e.g., that may not be present for FMCW-based channel estimation of an OFDM channel). For example, for FMCW-based channel estimation, the transmitting device and the receiving device may be configured and/or indicated to use one or more parameters for generating an FMCW signal (e.g., for transmission or locally for FMCW-based channel estimation at the receiving device). However, for interference measurements, different devices may transmit different signals using different waveforms and/or different parameters to be measured by the receiving device. For example, to measure the interference of a wireless channel, the receiving device may measure signals transmitted by devices from neighboring cells and/or devices in the same cell that use different waveforms and/or different transmit parameters. Therefore, it may be difficult to identify parameters for which the receiving device is capable of performing interference measurements (e.g., because it may be difficult to predict waveform types and/or parameters of signals measured by a receiving device that uses an analog receiver or an FMCW receiver to measure interference of an OFDM channel).

As indicated above, FIG. 6 is provided as an example. Other examples may differ from what is described with regard to FIG. 6.

Figure 7:
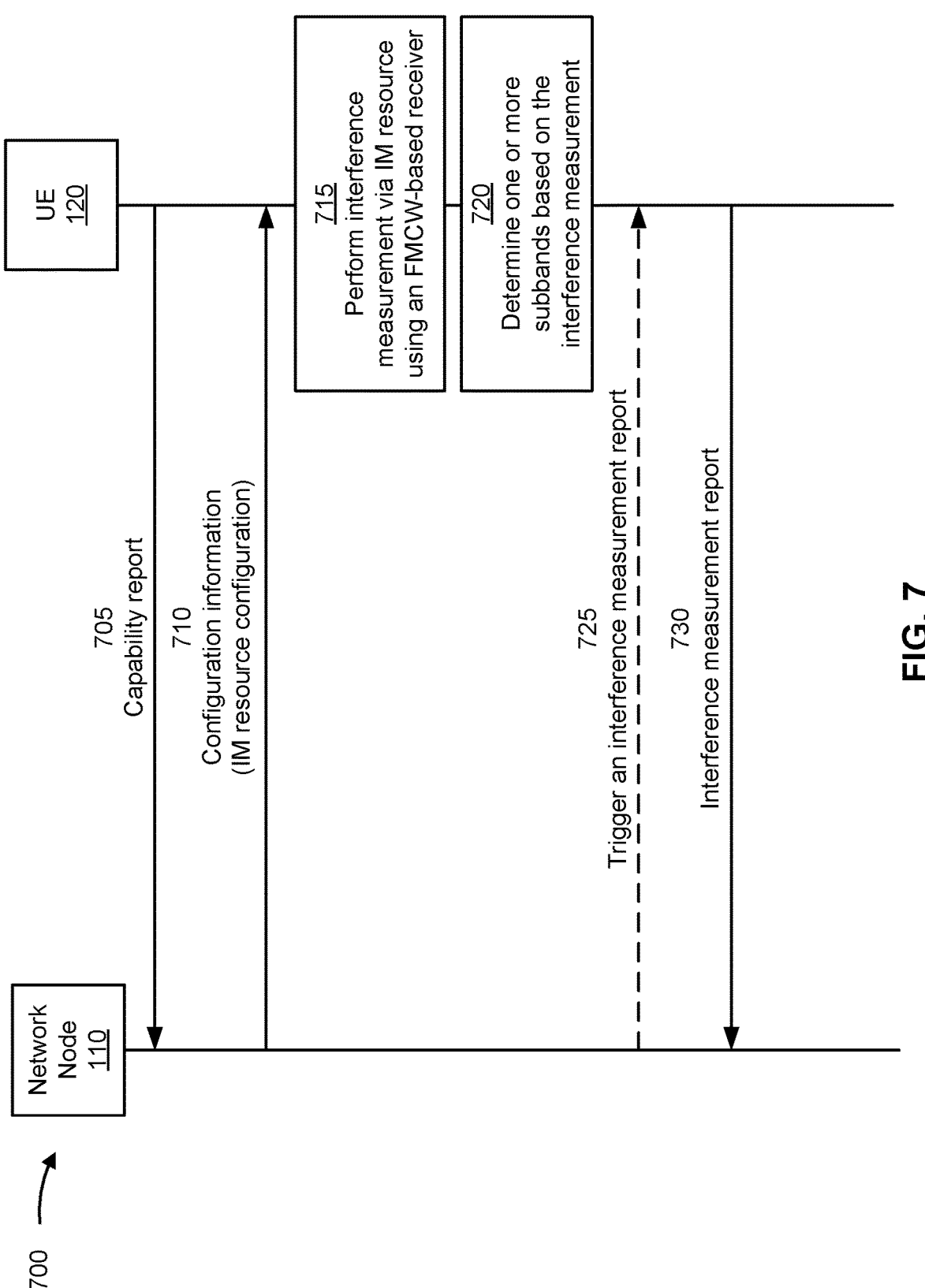
FIG. 7 is a diagram of an example associated with wideband interference measurements, in accordance with the present disclosure.

FIG. 7 is a diagram of an example 700 associated with wideband interference measurements, in accordance with the present disclosure. As shown in FIG. 7, a network node 110 (e.g., a base station, a CU, a DU, and/or an RU) may communicate with a UE 120. In some aspects, the network node 110 and the UE 120 may be part of a wireless network (e.g., the wireless network 100). The UE 120 and the network node 110 may have established a wireless connection prior to operations shown in FIG. 7.

In some aspects, the UE 120 may be a narrowband UE. For example, the UE 120 may support communicating via an OFDM channel using frequency domain resources that are less than a total bandwidth of the OFDM channel. The narrowband may be associated with a baseband capability of the UE 120. For example, the OFDM channel may be associated with a bandwidth that includes a set of subbands and/or a set of bandwidth parts. The UE 120 may support communicating via one or more subbands and/or one or more bandwidth parts, but not via the total bandwidth of the OFDM channel.

In some aspects, the UE 120 may include one or more receivers (e.g., one or more receive chains and/or one or more receiver architectures). The UE 120 may include a receiver associated with analog domain processing and/or time domain processing of received signals (e.g., such as the second receiver 608). For example, the UE 120 may include a receiver that is configured to receive FMCW signals (e.g., such as the second receiver 608). The receiver associated with analog domain processing and/or time domain processing and/or the receiver that is configured to receive FMCW signals may be referred to as an "FMCW-based receiver" or an "FMCW-based receive architecture," among other examples. For example, the FMCW-based receiver of the UE 120 may include one or more VCOs, one or more LPFs, and/or an ADC, among other examples. In some aspects, the UE 120 may be configured to receive and/or measure signals via an OFDM channel using the FMCW-based receiver. For example, as described in more detail elsewhere herein, the UE 120 may receive and/or process a signal that is transmitted via an OFDM channel using the FMCW-based receiver.

As shown by reference number 705, the UE 120 may transmit, and the network node 110 may receive, a capability report. The UE 120 may transmit the capability report via capability signaling, a UE assistance information (UAI) communication, RRC signaling, uplink MAC-CE signaling, uplink control information signaling, a physical uplink control channel (PUCCH), and/or a physical uplink shared channel (PUSCH), among other examples. The capability report may indicate whether the UE 120 supports one or more operations described herein. For example, the capability report may indicate one or more capability parameters. In some aspects, the one or more capability parameters may be information elements that indicate whether the UE 120 supports a given feature or operation. In some aspects, the one or more capability parameters may be associated with wideband interference measurement of an OFDM channel.

Additionally, or alternatively, the one or more capability parameters may be associated with a supported subband size for the OFDM channel. The supported subband size for the OFDM channel may be a supported (e.g., a maximum) frequency domain range for communications via the OFDM channel. In some aspects, the supported subband size for the OFDM channel may be based on a baseband processing capability of the UE 120 (e.g., for a digital receiver and/or an OFDM-based receiver of the UE 120).

For example, the capability report may indicate whether the UE 120 supports and/or includes an FMCW-based receiver (e.g., a capability parameter may indicate that the UE 120 supports FMCW-based reception, analog domain processing, and/or time domain processing of received signals for channel measurements). In some aspects, the capability report may indicate whether the UE 120 supports measuring an OFDM channel using the FMCW-based receiver. In some aspects, the capability report may indicate whether the UE 120 supports measuring interference associated with an OFDM channel using the FMCW-based receiver (e.g., the capability report may indicate whether the UE 120 supports FMCW Rx architecture for measuring OFDM interference). For example, the one or more capability parameters indicate that the UE supports wideband interference measurements of the OFDM channel using a receive chain associated with an FMCW.

In some aspects, the capability report may indicate one or more capability parameters associated with measurements (e.g., interference measurements) of an OFDM channel using the FMCW-based receiver. For example, the one or more capability parameters indicate a supported wideband bandwidth for wideband interference measurements. As used herein, "wideband interference measurement" may refer to an interference measurement that is performed using a wideband receiver (e.g., that is configured to measure and/or process a full bandwidth of a channel). In some aspects, "wideband interference measurement" may refer to an interference measurement by a device of a frequency band or bandwidth of a channel that is greater than a supported bandwidth for communications (e.g., data and/or control communications) via the channel by the device. For example, the UE 120 may support a first bandwidth for data communication or control communications via the OFDM channel and a second bandwidth for FMCW-based interference measurements of the OFDM channel, where the second bandwidth is larger than the first bandwidth. In some aspects, the UE 120 may perform a wideband interference measurement of an OFDM channel using an FMCW-based receiver (e.g., by measuring the OFDM channel in a similar manner as the second receiver 608). For example, a capability parameter may indicate a maximum supported wideband bandwidth (e.g., of an OFDM channel) that could be measured using an FMCW receive architecture of the UE 120. In some aspects, the capability report may indicate a first (maximum) supported wideband bandwidth for interference measurements of the OFDM channel and/or a second maximum) supported wideband bandwidth for channel estimation measurements of the OFDM channel using the FMCW receive architecture. The first supported wideband bandwidth and the second supported wideband bandwidth may be the same or different.

In some aspects, the one or more capability parameters indicate a supported analog-to-digital sampling rate (e.g., for an ADC of the FMCW-based receiver of the UE 120) for wideband interference measurements. For example, the capability report may indicate a maximum supported ADC sampling rate that can be used in the FMCW receive architecture of the UE 120. For example, one or more ADC sampling rate levels may be defined or otherwise fixed (e.g., by the network node 110 and/or by a wireless communication standard, such as the 3GPP). The UE 120 may select one ADC sampling rate level from the one or more ADC sampling rate levels (e.g., that is a highest sampling rate level, from the one or more ADC sampling rate levels, that is also less than a maximum supported ADC sampling rate of the FMCW receive architecture of the UE 120). The one or more capability parameters may indicate the selected ADC sampling rate level.

In some aspects, the one or more capability parameters include a supported interference measurement granularity for the wideband interference measurement. For example, the one or more capability parameters may indicate a minimum supported interference measurement granularity that can be measured using the FMCW receive architecture of the UE 120. The granularity may be in terms of frequency domain resources and/or a subband size. For example, the capability report may indicate that the UE 120 is capable of performing interference measurements for an OFDM channel using an FMCW-based receiver for a wideband bandwidth of X MHz (e.g., a supported wideband bandwidth for wideband interference measurements) and is capable of reporting individual interference measurement information for Y MHz (e.g., the granularity) band sizes within the X MHz wideband bandwidth. For example, the capability report may indicate that the UE 120 is capable of reporting interference measurements for a band size that is greater than or equal to the indicated granularity.

For example, there may be a relationship between wideband bandwidth, ADC sampling rate, and subband granularity of measurements. For example, the ADC sampling rate may be represented as $$ADC \text{ Sampling Rate} = \frac{S}{BW_{subband}} = \frac{BW_{wideband} * \Delta_f}{BW_{subband}},$$

where S is the slope of an FMCW signal, $BW_{wideband}$ is the wideband bandwidth, $\Delta_f$ may represent an SCS, and $BW_{subband}$ is the subband granularity for a measurement. By the UE 120 reporting the supported wideband bandwidth, the supported ADC sampling rate, and the supported granularity for the wideband interference measurements, the network node 110 may ensure that the configured interference measurement resource and/or a measurement reporting granularity that is configured by the UE 120 is actually supported by the UE 120.

In some aspects, the network node 110 may indicate that the UE 120 is to transmit an indication of one or more timing gaps associated with the wideband interference measurements. For example, the configuration information may indicate that the UE 120 is to transmit an indication of one or more minimum timing gaps for the wideband interference measurements. In some aspects, the one or more timing gaps may include a first timing gap associated with a first supported timing gap between the reception of the configuration information and the measurement of the interference measurement resource. For example, the first timing gap may be associated with a supported (e.g., a minimum) amount of time between CSI-IM scheduling or configuration (or a last OFDM data transmission) and a time associated with the CSI-IM resource. For example, the first timing gap may be associated with an amount of time for the UE 120 to switch from using an OFDM-based receiver to using the FMCW-based receiver (e.g., an Rx switching time). The UE 120 may transmit, and the network node 110 may receive, a first timing gap parameter indicating a supported amount of time for the first timing gap (e.g., in the capability report).

Additionally, the one or more timing gaps may include a second timing gap associated with a supported timing gap between the measurement of the IMR (e.g., the CSI-IM resource) and a transmission of a measurement report. For example, the second timing gap may be associated with a minimum amount of time between CSI-IM transmission (e.g., a time associated with the CSI-IM resource being measured) and the FMCW-based interference measurement report. The second timing gap may be based on an amount of time associated with the UE 120 performing the interference measurement(s) (e.g., using the FMCW-based receiver) and based on an amount of time for the UE 120 to switch from using the FMCW-based receiver to using the OFDM-based receiver. The UE 120 may transmit, and the network node 110 may receive, a second timing gap parameter indicating a supported time (e.g., a minimum time) for the second timing gap (e.g., in the capability report). In some aspects, the UE 120 may indicate a single timing gap parameter for both the first timing gap and the second timing gap (e.g., indicating a minimum time for both the first timing gap and the second timing gap). The network node 110 may configure the CSI-IM resource and the transmission of the interference measurement report to ensure that the timing gaps satisfy the supported timing gaps indicated by the UE 120.

As shown by reference number 710, the network node 110 may transmit, and the UE 120 may receive, configuration information. In some aspects, the UE 120 may receive the configuration information via one or more of system information signaling, RRC signaling, one or more MAC-CEs, and/or DCI, among other examples. In some aspects, the configuration information may include an indication of one or more configuration parameters for selection by the UE 120, and/or explicit configuration information for the UE 120 to use to configure itself, among other examples.

In some aspects, the configuration information may be based on, in response to, or otherwise associated with the capability report (e.g., and/or the one or more capability parameters). For example, the network node 110 may configure the UE 120 to perform one or more operations described herein based on, in response to, or otherwise associated with the capability report indicating that the UE 120 supports the one or more operations. As an example, the configuration information may indicate that the UE 120 is to perform wideband interference measurements of an OFDM channel using an FMCW-based receiver based on, in response to, or otherwise associated with the capability report indicating that the UE 120 supports performing the wideband interference measurements.

In some aspects, the configuration information may indicate that the UE 120 is to perform wideband interference measurements of an OFDM channel. In some aspects, the configuration information may indicate that the UE 120 is to use the FMCW-based receiver to perform the wideband interference measurements of the OFDM channel. For example, the configuration information may indicate that the UE 120 is to use a receive chain associated with a FMCW (e.g., the FMCW-based receiver) to measure an interference measurement resource (IMR). In other aspects, the configuration information may configure a wideband IMR (e.g., without indicating the type of receiver or receive architecture to be used by the UE 120 to measure the IMR to obtain the wideband interference measurements of the OFDM channel). The UE 120 may determine that the IMR is a wideband resource (e.g., based on frequency domain resources of the IMR being greater than a bandwidth size supported by the UE 120 for OFDM communications for the OFDM channel or based on the frequency domain resources of the IMR being equal to a total bandwidth for the OFDM channel). As used herein, a "wideband resource" may refer to a resource that is associated with frequency domain resources that are greater than a supported bandwidth for communications (e.g., data and/or control communications) via the channel by the UE 120. For example, the UE 120 may support narrowband OFDM communications via the OFDM channel (e.g., where the narrowband has a size based on, or equal to, one or more subbands of a bandwidth of the OFDM channel). The UE 120 may determine that the FMCW-based receiver is to be used to perform the wideband interference measurements of the OFDM channel (e.g., using the IMR) based on, in response to, or otherwise associated with the IMR being a wideband resource.

For example, the configuration information may indicate an IMR configuration. The IMR configuration may be, or may be associated with, a channel state information (CSI) reference signal (CSI-RS) resource configuration. The IMR configuration may also be referred to as a CSI-RS resource configuration for interference management. The IMR may be a CSI interference measurement (CSI-IM) resource. In some aspects, the IMR may be a zero-power (ZP) resource (e.g., a ZP CSI-RS resource for interference management). In other aspects, the IMR may be a non-zero-power (NZP) resource (e.g., an NZP CSI-RS resource). For example, the configuration information may indicate a CSI report setting or a CSI-RS resource configuration. For example, the network node 110 may configure a set of CSI-RS resources using a CSI reporting setting (e.g., a CSI report configuration). A CSI reporting setting may indicate resources and/or parameters associated with a CSI report to be transmitted by the UE 120 to the network node 110. The IMR configuration may indicate ZP resources (e.g., resources in which the network node 110 does not transmit a CSI-RS to the UE 120) associated with the UE 120 performing an interference measurement. More particularly, the IMR configuration may indicate a CSI-IM resource set to be used for performing the interference measurement.

For example, in the example 600, the IMR configuration indicates that the CSI-IM resource set m should be used for performing the interference measurement. The CSI-IM resource set may include one or more CSI-IM resources. The CSI reporting setting may associate each CSI-RS resource with a corresponding CSI-IM resource. More particularly, each CSI-RS resource may be resource-wise associated with a corresponding CSI-IM resource by the ordering of the CSI-RS resource and the CSI-IM resource in the corresponding resource sets. In that regard, a number of CSI-RS resources indicated by the CSI reporting setting may equal a number of CSI-IM resources indicated by the CSI reporting setting. Moreover, a CSI-RS resource and an associated CSI-IM resource may occur within a same slot.

For example, the configuration information may indicate a configuration for a CSI-IM resource (e.g., in a serving cell of the UE 120) for measuring OFDM interference (e.g., in other cells). The CSI-IM resource may be a ZP CSI-IM resource. The CSI-IM resource may be a wideband resource (e.g., associated with frequency domain resources spanning a full bandwidth of the OFDM channel). In some aspects, the CSI-IM resource may be configured as a periodic resource (e.g., the interference measurement resource may be a periodic resource). In other aspects, the CSI-IM resource may be configured as an aperiodic resource (e.g., the interference measurement resource may be an aperiodic resource). The UE 120 may be triggered to report interference measurement results periodically or aperiodically. For example, the configuration information (e.g., a CSI report setting or a CSI report configuration) may indicate that a CSI report (e.g., indicating the wideband interference measurements of the OFDM channel) is configured to be transmitted periodically by the UE 120. In other aspects, the configuration information (e.g., a CSI report setting or a CSI report configuration) may indicate that the CSI report is configured to be transmitted aperiodically by the UE 120 (e.g., in response to a request or trigger transmitted by the network node 110).

For example, the configuration information may indicate that the IMR (e.g., the CSI-IM resource) is a periodic resource and that the CSI report (.g., an interference measurement report) is to be transmitted periodically. As another example, the configuration information may indicate that the IMR (e.g., the CSI-IM resource) is a periodic resource and that the CSI report (.g., an interference measurement report) is to be transmitted aperiodically. As another example, the configuration information may indicate that the IMR (e.g., the CSI-IM resource) is an aperiodic resource and that the CSI report (.g., an interference measurement report) is to be transmitted aperiodically.

In some aspects, the network node 110 may determine that multiple UEs (e.g., including the UE 120) are to be configured with the IMR (e.g., the same CSI-IM resource). For example, the CSI-IM resource may be a ZP CSI-IM resource. Therefore, the network node 110 may configure multiple UEs with the same CSI-IM (e.g., because the network node 110 does not actually transmit using the CSI-IM resource). For example, the IMR (e.g., the CSI-IM) configured for the UE 120 may be associated with multiple UEs. The multiple UEs may each use the CSI-IM resource to measure interference of an OFDM channel (e.g., interference cause by transmissions from other cells), as described in more detail elsewhere herein. This may improve network resource utilization because the network node 110 configure a single resource to enable multiple UEs to perform wideband interference measurements of the OFDM channel (e.g., rather than configuring separate CSI-IM resources for each UE). In other words, the CSI-IM resource may be reused for multiple UEs to enhance the resource utilization efficiency of the wireless network.

In some aspects, the configuration information may indicate a subband size associated with the interference measurements of the OFDM channel. The subband size may be a measurement granularity. For example, the configuration information may indicate that interference measurement results are to be reported for one or more subbands (e.g., where the one or more subbands are associated with respective reported interference measurement values). In some aspects, the configuration information may indicate the subbands (e.g., within a bandwidth of the OFDM channel) for which interference measurement information is to be reported by the UE 120. For example, the configuration information may indicate the one or more subbands (e.g., for which interference measurement information is to be included in the interference measurement report) and/or a subband size for the interference measurements of the OFDM channel. The one or more subbands may be non-overlapping in the frequency domain. In some aspects, one or more subbands may be overlapping in the frequency domain.

For example, the IMR (e.g., the CSI-IM resource) may associated with one or more subbands and interference measurement information (e.g., transmitted by the UE 120 as described elsewhere herein) may indicate one or more measurements for respective subbands of the one or more subbands (e.g., the configuration information may indicate that the UE 120 is to report to the network node interference measurements in a per-subband average manner). In some aspects, an interference measurement for a subband may be an average interference measurement for the subband.

In some aspects, the configuration information may indicate one or more time domain resources (e.g., one or more symbols, one or more slots, and/or one or more other time domain resources) associated with the IMR (e.g., the CSI-IM resource). For example, the UE 120 may be indicated with one or more symbols (e.g., one or more OFDM symbols) for the wideband interference measurement of the OFDM channel. In other words, the configuration information (e.g., a configuration of the CSI-IM resource) may indicate one or more OFDM symbols during which the UE 120 is to perform the wideband interference measurement(s) of the OFDM channel. In some aspects, the configuration information may indicate that the UE 120 is to report one or more measurements for respective time domain resources of the one or more time domain resources. For example, the configuration information may indicate that the UE 120 is to report an interference measurement for each symbol of the one or more symbols configured for the CSI-IM resource (e.g., the UE 120 may be configured to report interference measurements in a per-symbol manner). In other aspects, the configuration information may indicate that the UE 120 is to report a measurement for the one or more time domain resources (e.g., an average interference measurement for all of the one or more symbols configured for the CSI-IM resource).

In some aspects, the configuration information may indicate that the UE 120 is to report one or more measurement values of the interference measurements. For example, the configuration information may indicate that the UE 120 is to transmit an indication of one or more interference plus noise values (e.g., one or more signal-to-interference-plus-noise ratio (SINR) values). Additionally, or alternatively, the configuration information may indicate that the UE 120 is to transmit an indication of one or more subbands. The one or more subbands may be selected by the UE 120 based on, in response to, or otherwise associated with the interference measurements of the OFDM channel. For example, the one or more subbands may be associated with a lowest interference measurement value. Additionally, or alternatively, the one or more subbands may be associated with an interference measurement value that does not satisfy an interference threshold. In other words, the UE 120 may transmit an indication of one or more subbands associated with low measured interference in the OFDM channel (e.g., which may be referred to colloquially as "preferred" subbands of the UE 120).

The UE 120 may configure itself based at least in part on the configuration information. In some aspects, the UE 120 may be configured to perform one or more operations described herein based at least in part on the configuration information.

As shown by reference number 715, the UE 120 may perform interference measurement(s) via the IMR (e.g., the CSI-IM resource) configured for the UE 120 using an analog receiver (e.g., the FMCW-based receiver). In some aspects, the UE 120 may measure (e.g., based on the reception of the configuration information), the configured interference measurement resource to obtain interference measurement information associated with the OFDM channel. For example, the UE 120 may measure interference for the OFDM channel (e.g., using resource(s) associated with the CSI-IM resource) using the FMCW-based receiver. In some aspects, the UE 120 may perform wideband interference measurements of the OFDM channel (e.g., using the FMCW-based receiver). For example, the UE 120 may perform interference estimation for data OFDM symbols using the FMCW-based receiver. In some aspects, the UE 120 may measure the interference measurement resource (e.g., the CSI-IM resource) based on, in response to, or otherwise associated with receiving (e.g., from the network node 110) a trigger (e.g., included in a communication, such as a MAC-CE communication or a DCI communication) to measure the interference measurement resource (e.g., when the interference measurement resource is configured as an aperiodic resource).

As an example, the UE 120 may estimate a received signal associated with the IMR (e.g., the CSI-IM resource) using the FMCW-based receiver. For example, the UE 120 may receive a wideband signal using the FMCW-based receiver. The UE 120 may generate a local FMCW signal (e.g., based on the estimated signal received via the channel, which may be a low power signal or no signal). The UE 120 may combine the received signal with the locally generated FMCW signal and provide the combined signal to an LPF (e.g., to generate a narrowband signal from the received wideband signal in the time domain). As a result, a sampling rate for the ADC of the FMCW-based receiver (e.g., used to measure the interference of the OFDM channel) may be reduced (e.g., as compared to if the UE 120 were to use a digital receiver to measure the interference of the OFDM channel). The UE 120 may measure an energy level or a power spectral density (PSD) associated with the CSI-IM resource based on the time domain processing of the received signal(s).

As a result, the UE 120 may estimate and/or measure interference for the OFDM channel that may be caused by transmissions from other cells. The transmissions from the other cells may be FMCW signal transmissions and/or OFDM-based transmissions. By estimating the received signal at the FMCW-based receiver and obtaining the PSD of the CSI-IM resource, the UE 120 may be enabled to estimate the interference for the OFDM channel (e.g., regardless of a waveform type of the signals causing the interference). Additionally, the UE 120 may be enabled to obtain interference measurement information for all frequency domain resources of the CSI-IM resource in one measurement (e.g., rather than in multiple measurements and/or multiple samples as may be the case when the UE 120 uses a digital receiver with a baseband capability that is less than the frequency domain size of the CSI-IM resource). This may reduce latency associated with obtaining the interference measurement information for the OFDM channel. Additionally, this may conserve power of the UE 120 when performing the interference measurements for the OFDM channel. The estimated interference for the OFDM channel as measured using the FMCW-based receiver is depicted and described in more detail in connection with FIG. 8.

In some aspects, the UE 120 may estimate an interference measurement value (e.g., an SINR) for one or more subbands associated with the CSI-IM resource. In some aspects, the UE 120 may estimate an average interference measurement value for a given subband. In some aspects, the UE 120 may estimate an average interference measurement value for a given subband during a given OFDM symbol. In other aspects, the UE 120 may estimate an average interference measurement value for a given subband over multiple OFDM symbols.

As shown by reference number 720, the UE 120 may determine one or more subbands based on the wideband interference measurement. For example, the UE 120 may select one or more subbands based on the wideband interference measurement. As an example, the UE 120 may select one or more subbands, from a set of subbands associated with the CSI-IM resource, that are associated with the lowest interference measurement value(s). As another example, the UE 120 may select a single subband that is associated with a lowest interference measurement value. As another example, the UE 120 may select one or more subbands that are associated with interference measurement value(s) that satisfy the interference threshold. In other words, the UE 120 may determine the subbands, of a bandwidth of the OFDM channel, that are associated with low (or the lowest) interference levels as observed by the UE 120.

In some aspects, as shown by reference number 725, the network node 110 may transmit, and the UE 120 may receive, a trigger for an interference measurement report (e.g., a CSI report associated with interference management). For example, the network node 110 may transmit the trigger based on the interference measurement report being an aperiodic measurement report. The trigger may be included in a MAC-CE communication and/or a DCI communication, among other examples. The trigger may cause the UE 120 to generate and/or to transmit the interference measurement report, as described elsewhere herein.

As shown by reference number 730, the UE 120 may transmit, and the network node 110 may receive, the interference measurement report. For example, the UE 120 may transmit, and the network node 110 may receive, a measurement report indicating interference measurement information (e.g., obtained by the UE 120 based on measuring the wideband interference measurement resource, as described in more detail elsewhere herein). The interference measurement report may be a CSI report. The interference measurement report may indicate one or more interference measurements for respective subbands of the OFDM channel. For example, the interference measurement report may indicate an average interference measurement value for a given subband during a given OFDM symbol. In other aspects, t the interference measurement report may indicate an average interference measurement value for a given subband over multiple OFDM symbols. In some aspects, the interference measurement report may indicate one or more subbands determined and/or selected by the UE 120 (e.g., as described above).

The network node 110 may perform one or more actions based on, in response to, or otherwise associated with the interference measurement report. For example, the network node 110 may determine and/or indicate (e.g., to the UE 120) a subband for communications (e.g., OFDM communications) between the network node 110 and the UE 120 via the OFDM channel. For example, the network node 110 may determine a subband of the OFDM channel associated with relatively low interference (e.g., as observed and/or measured by the UE 120). The network node 110 may transmit, and the UE 120 may receive, an indication to use the subband for OFDM communications between the UE 120 and the network node 110.

As indicated above, FIG. 7 is provided as an example. Other examples may differ from what is described with respect to FIG. 7.

Figure 8:
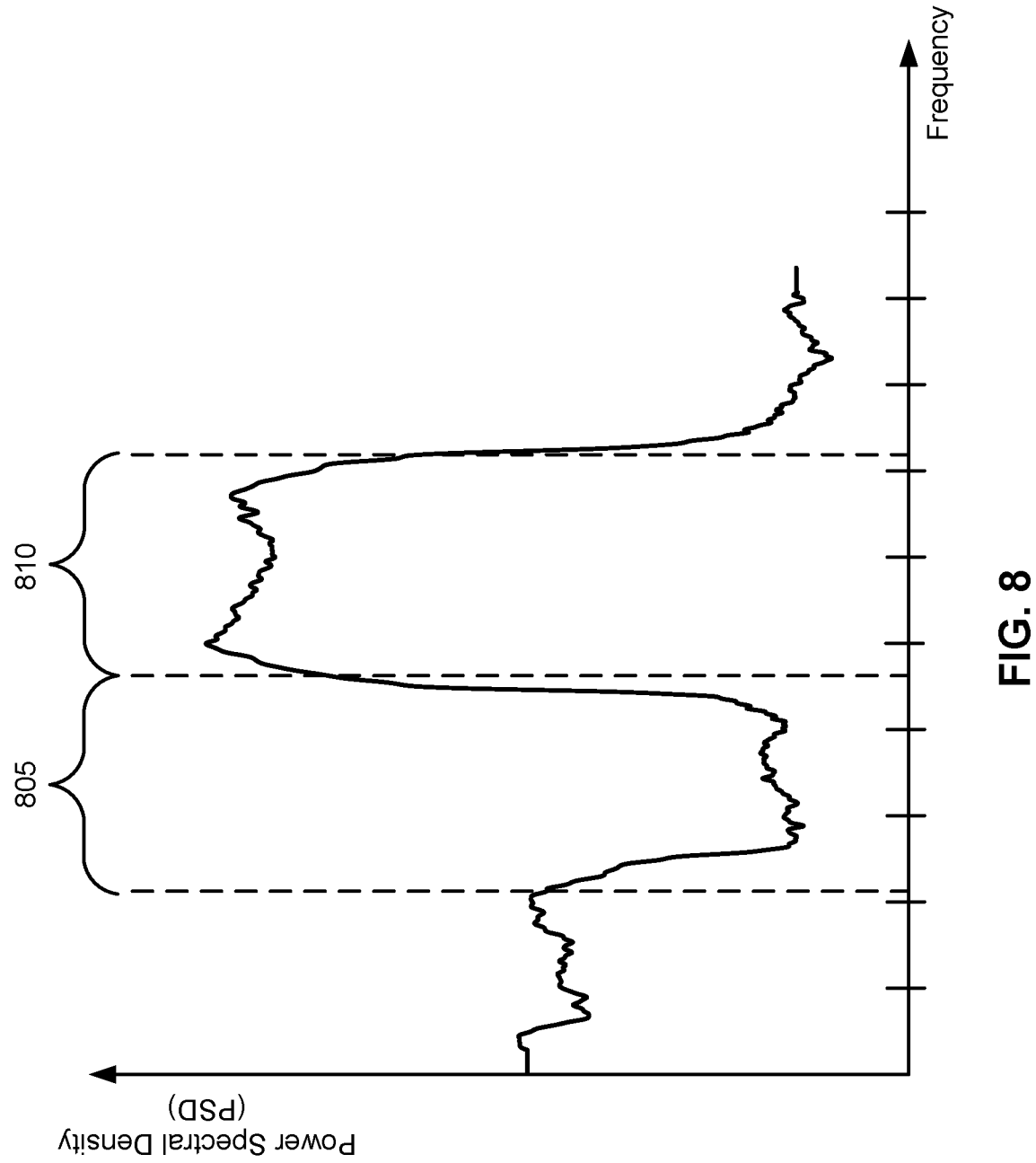
FIG. 8 is a diagram of an example associated with wideband interference measurements, in accordance with the present disclosure.

FIG. 8 is a diagram of an example 800 associated with wideband interference measurements, in accordance with the present disclosure. FIG. 8 depicts a graph of estimated interference levels for a wideband interference measurement resource (e.g., performed by a UE 120 in a similar manner as described in more detail elsewhere herein, such as in connection with FIG. 7). For example, the estimated interference levels depicted in FIG. 8 may be for an OFDM channel (e.g., of one or more OFDM symbols) obtained by a UE 120 using an analog receiver, such as an FMCW-based receiver. For example, the UE 120 may use time domain processing of an estimated signal for an interference measurement resource (e.g., a CSI-IM resource) to estimate a PSD (e.g., measured in decibel-milliwatt (dBm)) of the estimated received signal over a wideband frequency range.

As shown in FIG. 8, the UE 120 may obtain frequency domain measurement information over a wideband frequency range using the analog receiver and/or FMCW-based receiver (e.g., as described in more detail elsewhere herein). For example, the UE 120 may obtain a PSD for the received signal over the wideband frequency range. This may enable the UE 120 to identify subbands (e.g., portions of the wideband frequency range) associated with lower interference levels while also using a relatively low ADC sampling rate. For example, the UE 120 may identify that a first subband 805 is associated with relatively low interference levels (e.g., due to the low PSD over the first subband 805 as compared to the PSD of the rest of the wideband frequency range). Additionally, the UE 120 may identify that a second subband 810 is associated with relatively high interference levels (e.g., due to the high PSD over the second subband 810 as compared to the PSD of the rest of the wideband frequency range). The UE 120 may estimate an interference plus noise level for a given subband based on the measured PSD over the given subband.

As an example, the UE 120 may determine that the first subband 805 is a "preferred" subband because of the relatively low interference levels. Additionally, the UE 120 may determine that the second subband 810 should not be used for OFDM communications because of the relatively high interference levels. For example, the UE 120 may indicate the first subband 805 in an interference measurement report (e.g., as a "preferred" subband). The UE 120 may indicate that the second subband 810 should not be used (e.g., in an interference measurement report). The UE 120 may determine interference measurement value(s) for each subband based on the PSD values measured by the UE 120.

As indicated above, FIG. 8 is provided as an example. Other examples may differ from what is described with respect to FIG. 8.

FIG. 9 is a diagram illustrating an example process 900 performed, for example, by a UE, in accordance with the present disclosure. Example process 900 is an example where the UE (e.g., UE 120) performs operations associated with wideband interference measurements.

As shown in FIG. 9, in some aspects, process 900 may include transmitting, to a network node, a capability report indicating one or more capability parameters that are associated with wideband interference measurement of an OFDM channel and a supported subband size for the OFDM channel (block 910). For example, the UE (e.g., using transmission component 1104 and/or communication manager 1106, depicted in FIG. 11) may transmit, to a network node, a capability report indicating one or more capability parameters that are associated with wideband interference measurement of an OFDM channel and a supported subband size for the OFDM channel, as described above.

As further shown in FIG. 9, in some aspects, process 900 may include receiving, from the network node and based on the transmission of the capability report, configuration information indicating an interference measurement resource associated with a set of frequency domain resources, where the set of frequency domain resources includes a greater number of frequency domain resources than the supported subband size (block 920). For example, the UE (e.g., using reception component 1102 and/or communication manager 1106, depicted in FIG. 11) may receive, from the network node and based on the transmission of the capability report, configuration information indicating an interference measurement resource associated with a set of frequency domain resources, where the set of frequency domain resources includes a greater number of frequency domain resources than the supported subband size, as described above.

As further shown in FIG. 9, in some aspects, process 900 may include measuring, based on the reception of the configuration information, the interference measurement resource to obtain interference measurement information associated with the OFDM channel (block 930). For example, the UE (e.g., using communication manager 1106, depicted in FIG. 11) may measure, based on the reception of the configuration information, the interference measurement resource to obtain interference measurement information associated with the OFDM channel, as described above.

As further shown in FIG. 9, in some aspects, process 900 may include transmitting, to the network node, a measurement report indicating the interference measurement information (block 940). For example, the UE (e.g., using transmission component 1104 and/or communication manager 1106, depicted in FIG. 11) may transmit, to the network node, a measurement report indicating the interference measurement information, as described above.

Process 900 may include additional aspects, such as any single aspect or any combination of aspects described below and/or in connection with one or more other processes described elsewhere herein.

In a first aspect, the measurement of the interference measurement resource includes measuring the interference measurement resource using a receive chain associated with a frequency modulated continuous waveform based on the set of frequency domain resources including the greater number of frequency domain resources than the supported subband size.

In a second aspect, alone or in combination with the first aspect, the one or more capability parameters indicate that the UE supports wideband interference measurements of the OFDM channel using a receive chain associated with a frequency modulated continuous waveform.

In a third aspect, alone or in combination with one or more of the first and second aspects, the one or more capability parameters indicate a supported wideband bandwidth for the wideband interference measurement.

In a fourth aspect, alone or in combination with one or more of the first through third aspects, the one or more capability parameters indicate a supported analog-to-digital sampling rate for the wideband interference measurement.

In a fifth aspect, alone or in combination with one or more of the first through fourth aspects, the one or more capability parameters include a supported interference measurement granularity for the wideband interference measurement.

In a sixth aspect, alone or in combination with one or more of the first through fifth aspects, the configuration information indicates that the UE is to use a receive chain associated with a frequency modulated continuous waveform to measure the interference measurement resource.

In a seventh aspect, alone or in combination with one or more of the first through sixth aspects, the configuration information indicates a subband size associated with the interference measurement resource.

In an eighth aspect, alone or in combination with one or more of the first through seventh aspects, the interference measurement resource is associated with one or more subbands, and the interference measurement information indicates one or more measurements for respective subbands of the one or more subbands.

In a ninth aspect, alone or in combination with one or more of the first through eighth aspects, the configuration information indicates one or more time domain resources associated with the interference measurement resource, and the interference measurement information indicates one or more measurements for respective time domain resources of the one or more time domain resources, or a measurement for the one or more time domain resources.

In a tenth aspect, alone or in combination with one or more of the first through ninth aspects, the interference measurement information indicates one or more measurement values associated with the interference measurement resource.

In an eleventh aspect, alone or in combination with one or more of the first through tenth aspects, the interference measurement resource is associated with one or more subbands, and the interference measurement information indicates one or more selected subbands of the one or more subbands.

In a twelfth aspect, alone or in combination with one or more of the first through eleventh aspects, the interference measurement resource is a periodic resource or an aperiodic resource.

In a thirteenth aspect, alone or in combination with one or more of the first through twelfth aspects, the measurement report is a periodic measurement report or an aperiodic measurement report.

In a fourteenth aspect, alone or in combination with one or more of the first through thirteenth aspects, the interference measurement resource is associated with multiple UEs including the UE.

In a fifteenth aspect, alone or in combination with one or more of the first through fourteenth aspects, the one or more capability parameters include one or more timing gap parameters for the wideband interference measurement.

In a sixteenth aspect, alone or in combination with one or more of the first through fifteenth aspects, the one or more timing gap parameters include at least one of a first timing gap parameter indicating a first supported timing gap between the reception of the configuration information and the measurement of the interference measurement resource, or a second timing gap parameter indicating a second supported timing gap between the measurement of the interference measurement resource and the transmission of the measurement report.

In a seventeenth aspect, alone or in combination with one or more of the first through sixteenth aspects, the interference measurement resource is a zero-power resource.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a network node, in accordance with the present disclosure. Example process 1000 is an example where the network node (e.g., network node 110) performs operations associated with wideband interference measurements.

As shown in FIG. 10, in some aspects, process 1000 may include receiving a capability report, associated with a UE, indicating one or more capability parameters that are associated with wideband interference measurement of an OFDM channel and a supported subband size for the OFDM channel (block 1010). For example, the network node (e.g., using reception component 1202 and/or communication manager 1206, depicted in FIG. 12) may receive a capability report, associated with a UE, indicating one or more capability parameters that are associated with wideband interference measurement of an OFDM channel and a supported subband size for the OFDM channel, as described above.

As further shown in FIG. 10, in some aspects, process 1000 may include transmitting, based on the reception of the capability report, configuration information for the UE indicating an interference measurement resource associated with a set of frequency domain resources, where the set of frequency domain resources includes a greater number of frequency domain resources than the supported subband size (block 1020). For example, the network node (e.g., using transmission component 1204 and/or communication manager 1206, depicted in FIG. 12) may transmit, based on the reception of the capability report, configuration information for the UE indicating an interference measurement resource associated with a set of frequency domain resources, where the set of frequency domain resources includes a greater number of frequency domain resources than the supported subband size, as described above.

As further shown in FIG. 10, in some aspects, process 1000 may include receiving a measurement report, associated with the UE, indicating interference measurement information associated with the interference measurement resource and the OFDM channel (block 1030). For example, the network node (e.g., using reception component 1202 and/or communication manager 1206, depicted in FIG. 12) may receive a measurement report, associated with the UE, indicating interference measurement information associated with the interference measurement resource and the OFDM channel, as described above.

Process 1000 may include additional aspects, such as any single aspect or any combination of aspects described below and/or in connection with one or more other processes described elsewhere herein.

In a first aspect, the one or more capability parameters indicate that the UE supports wideband interference measurements of the OFDM channel using a receive chain associated with a frequency modulated continuous waveform.

In a second aspect, alone or in combination with the first aspect, the one or more capability parameters indicate a supported wideband bandwidth for the wideband interference measurement.

In a third aspect, alone or in combination with one or more of the first and second aspects, the one or more capability parameters indicate a supported analog-to-digital sampling rate for the wideband interference measurement.

In a fourth aspect, alone or in combination with one or more of the first through third aspects, the one or more capability parameters include a supported interference measurement granularity for the wideband interference measurement.

In a fifth aspect, alone or in combination with one or more of the first through fourth aspects, the configuration information indicates that the UE is to use a receive chain associated with a frequency modulated continuous waveform to measure the interference measurement resource.

In a sixth aspect, alone or in combination with one or more of the first through fifth aspects, the configuration information indicates a subband size associated with the interference measurement resource.

In a seventh aspect, alone or in combination with one or more of the first through sixth aspects, the interference measurement resource is associated with one or more subbands, and the interference measurement information indicates one or more measurements for respective subbands of the one or more subbands.

In an eighth aspect, alone or in combination with one or more of the first through seventh aspects, the configuration information indicates one or more time domain resources associated with the interference measurement resource, and the interference measurement information indicates one or more measurements for respective time domain resources of the one or more time domain resources, or a measurement for the one or more time domain resources.

In a ninth aspect, alone or in combination with one or more of the first through eighth aspects, the interference measurement information indicates one or more measurement values associated with the interference measurement resource.

In a tenth aspect, alone or in combination with one or more of the first through ninth aspects, the interference measurement resource is associated with one or more subbands, and the interference measurement information indicates one or more selected subbands of the one or more subbands.

In an eleventh aspect, alone or in combination with one or more of the first through tenth aspects, the interference measurement resource is a periodic resource or an aperiodic resource.

In a twelfth aspect, alone or in combination with one or more of the first through eleventh aspects, the measurement report is a periodic measurement report or an aperiodic measurement report.

In a thirteenth aspect, alone or in combination with one or more of the first through twelfth aspects, the interference measurement resource is associated with multiple UEs including the UE.

In a fourteenth aspect, alone or in combination with one or more of the first through thirteenth aspects, the one or more capability parameters include one or more timing gap parameters for the wideband interference measurement.

In a fifteenth aspect, alone or in combination with one or more of the first through fourteenth aspects, the one or more timing gap parameters include at least one of a first timing gap parameter indicating a first supported timing gap between receiving the configuration information and measuring the interference measurement resource, or a second timing gap parameter indicating a second supported timing gap between measuring the interference measurement resource and transmitting the measurement report.

In a sixteenth aspect, alone or in combination with one or more of the first through fifteenth aspects, the interference measurement resource is a zero-power resource.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
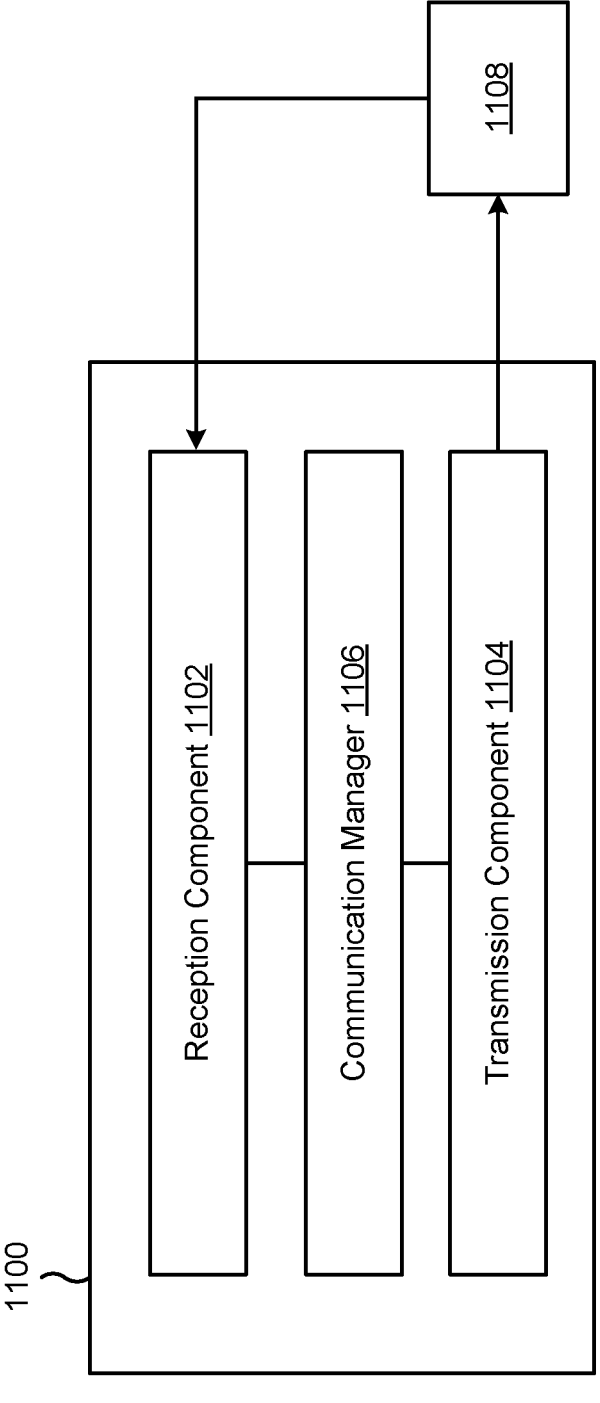
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 7 and 8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/ or provide control information to the reception component 1102 and/or the transmission component 1104 to control reception and/or transmission of communications.

The transmission component 1104 may transmit, to a network node, a capability report indicating one or more capability parameters that are associated with wideband interference measurement of an OFDM channel and a supported subband size for the OFDM channel. The reception component 1102 may receive, from the network node and based on the transmission of the capability report, configuration information indicating an interference measurement resource associated with a set of frequency domain resources, wherein the set of frequency domain resources includes a greater number of frequency domain resources than the supported subband size. The communication manager 1106 may measure, based on the reception of the configuration information, the interference measurement resource to obtain interference measurement information associated with the OFDM channel. The transmission component 1104 may transmit, to the network node, a measurement report indicating the interference measurement information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
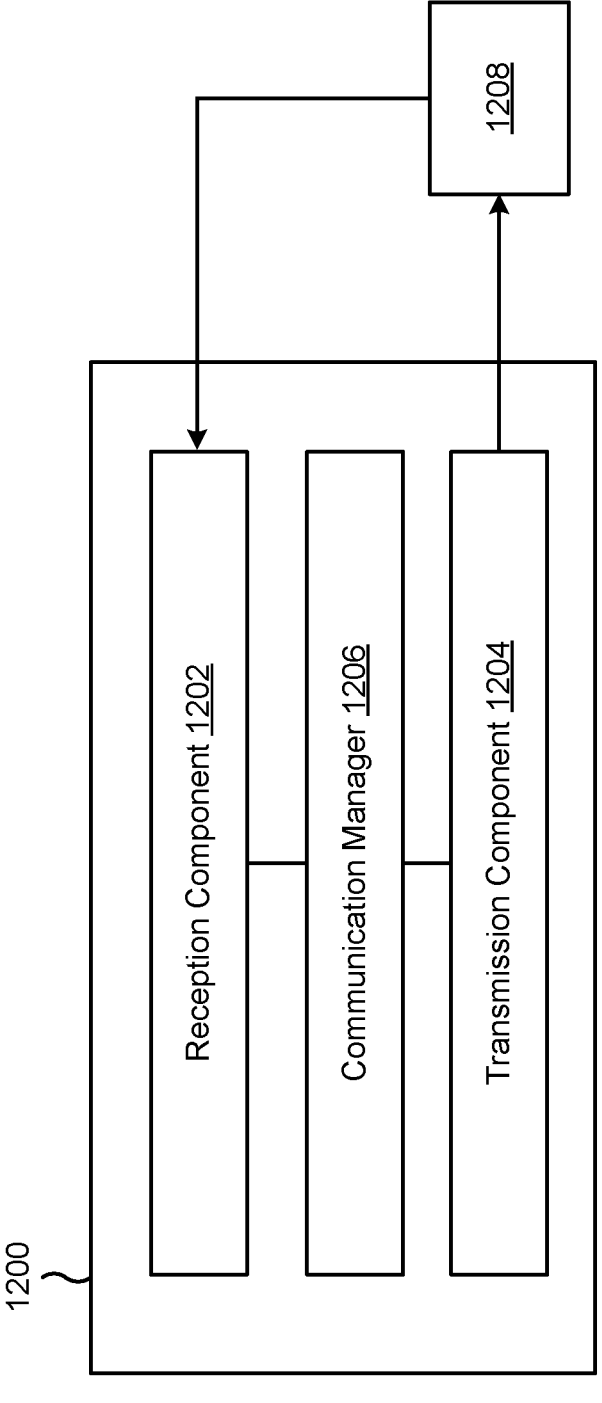
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 7 and 8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive a capability report, associated with a UE, indicating one or more capability parameters that are associated with wideband interference measurement of an OFDM channel and a supported subband size for the OFDM channel. The transmission component 1204 may transmit, based on the reception of the capability report, configuration information for the UE indicating an interference measurement resource associated with a set of frequency domain resources, wherein the set of frequency domain resources includes a greater number of frequency domain resources than the supported subband size. The reception component 1202 may receive a measurement report, associated with the UE, indicating interference measurement information associated with the interference measurement resource and the OFDM channel.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: transmitting, to a network node, a capability report indicating one or more capability parameters that are associated with wideband interference measurement of an orthogonal frequency division multiplexing (OFDM) channel and a supported subband size for the OFDM channel; receiving, from the network node and based on the transmission of the capability report, configuration information indicating an interference measurement resource associated with a set of frequency domain resources, wherein the set of frequency domain resources includes a greater number of frequency domain resources than the supported subband size; measuring, based on the reception of the configuration information, the interference measurement resource to obtain interference measurement information associated with the OFDM channel; and transmitting, to the network node, a measurement report indicating the interference measurement information.

Aspect 2: The method of Aspect 1, wherein the measurement of the interference measurement resource comprises: measuring the interference measurement resource using a receive chain associated with a frequency modulated continuous waveform based on the set of frequency domain resources including the greater number of frequency domain resources than the supported subband size.

Aspect 3: The method of any of Aspects 1-2, wherein the one or more capability parameters indicate that the UE supports wideband interference measurements of the OFDM channel using a receive chain associated with a frequency modulated continuous waveform.

Aspect 4: The method of any of Aspects 1-3, wherein the one or more capability parameters indicate a supported wideband bandwidth for the wideband interference measurement.

Aspect 5: The method of any of Aspects 1-4, wherein the one or more capability parameters indicate a supported analog-to-digital sampling rate for the wideband interference measurement.

Aspect 6: The method of any of Aspects 1-5, wherein the one or more capability parameters include a supported interference measurement granularity for the wideband interference measurement.

Aspect 7: The method of any of Aspects 1-6, wherein the configuration information indicates that the UE is to use a receive chain associated with a frequency modulated continuous waveform to measure the interference measurement resource.

Aspect 8: The method of any of Aspects 1-7, wherein the configuration information indicates a subband size associated with the interference measurement resource.

Aspect 9: The method of any of Aspects 1-8, wherein the interference measurement resource is associated with one or more subbands, and wherein the interference measurement information indicates one or more measurements for respective subbands of the one or more subbands.

Aspect 10: The method of any of Aspects 1-9, wherein the configuration information indicates one or more time domain resources associated with the interference measurement resource, and wherein the interference measurement information indicates: one or more measurements for respective time domain resources of the one or more time domain resources, or a measurement for the one or more time domain resources.

Aspect 11: The method of any of Aspects 1-10, wherein the interference measurement information indicates one or more measurement values associated with the interference measurement resource.

Aspect 12: The method of any of Aspects 1-11, wherein the interference measurement resource is associated with one or more subbands, and wherein the interference measurement information indicates one or more selected subbands of the one or more subbands.

Aspect 13: The method of any of Aspects 1-12, wherein the interference measurement resource is a periodic resource or an aperiodic resource.

Aspect 14: The method of any of Aspects 1-13, wherein the measurement report is a periodic measurement report or an aperiodic measurement report.

Aspect 15: The method of any of Aspects 1-14, wherein the interference measurement resource is associated with multiple UEs including the UE.

Aspect 16: The method of any of Aspects 1-15, wherein the one or more capability parameters include one or more timing gap parameters for the wideband interference measurement.

Aspect 17: The method of Aspect 16, wherein the one or more timing gap parameters include at least one of: a first timing gap parameter indicating a first supported timing gap between the reception of the configuration information and the measurement of the interference measurement resource, or a second timing gap parameter indicating a second supported timing gap between the measurement of the interference measurement resource and the transmission of the measurement report.

Aspect 18: The method of any of Aspects 1-17, wherein the interference measurement resource is a zero-power resource.

Aspect 19: A method of wireless communication performed by a network node, comprising: receiving a capability report, associated with a user equipment (UE), indicating one or more capability parameters that are associated with wideband interference measurement of an orthogonal frequency division multiplexing (OFDM) channel and a supported subband size for the OFDM channel; transmitting, based on the reception of the capability report, configuration information for the UE indicating an interference measurement resource associated with a set of frequency domain resources, wherein the set of frequency domain resources includes a greater number of frequency domain resources than the supported subband size; and receiving a measurement report, associated with the UE, indicating interference measurement information associated with the interference measurement resource and the OFDM channel.

Aspect 20: The method of Aspect 19, wherein the one or more capability parameters indicate that the UE supports wideband interference measurements of the OFDM channel using a receive chain associated with a frequency modulated continuous waveform.

Aspect 21: The method of any of Aspects 19-20, wherein the one or more capability parameters indicate a supported wideband bandwidth for the wideband interference measurement.

Aspect 22: The method of any of Aspects 19-21, wherein the one or more capability parameters indicate a supported analog-to-digital sampling rate for the wideband interference measurement.

Aspect 23: The method of any of Aspects 19-22, wherein the one or more capability parameters include a supported interference measurement granularity for the wideband interference measurement.

Aspect 24: The method of any of Aspects 19-23, wherein the configuration information indicates that the UE is to use a receive chain associated with a frequency modulated continuous waveform to measure the interference measurement resource.

Aspect 25: The method of any of Aspects 19-24, wherein the configuration information indicates a subband size associated with the interference measurement resource.

Aspect 26: The method of any of Aspects 19-25, wherein the interference measurement resource is associated with one or more subbands, and wherein the interference measurement information indicates one or more measurements for respective subbands of the one or more subbands.

Aspect 27: The method of any of Aspects 19-26, wherein the configuration information indicates one or more time domain resources associated with the interference measurement resource, and wherein the interference measurement information indicates: one or more measurements for respective time domain resources of the one or more time domain resources, or a measurement for the one or more time domain resources.

Aspect 28: The method of any of Aspects 19-27, wherein the interference measurement information indicates one or more measurement values associated with the interference measurement resource.

Aspect 29: The method of any of Aspects 19-28, wherein the interference measurement resource is associated with one or more subbands, and wherein the interference measurement information indicates one or more selected subbands of the one or more subbands.

Aspect 30: The method of any of Aspects 19-29, wherein the interference measurement resource is a periodic resource or an aperiodic resource.

Aspect 31: The method of any of Aspects 19-30, wherein the measurement report is a periodic measurement report or an aperiodic measurement report.

Aspect 32: The method of any of Aspects 19-31, wherein the interference measurement resource is associated with multiple UEs including the UE.

Aspect 33: The method of any of Aspects 19-32, wherein the one or more capability parameters include one or more timing gap parameters for the wideband interference measurement.

Aspect 34: The method of Aspect 33, wherein the one or more timing gap parameters include at least one of: a first timing gap parameter indicating a first supported timing gap between receiving the configuration information and measuring the interference measurement resource, or a second timing gap parameter indicating a second supported timing gap between measuring the interference measurement resource and transmitting the measurement report.

Aspect 35: The method of any of Aspects 19-34, wherein the interference measurement resource is a zero-power resource.

Aspect 36: An apparatus for wireless communication at a device, comprising a processor; memory coupled with the processor; and instructions stored in the memory and executable by the processor to cause the apparatus to perform the method of one or more of Aspects 1-35.

Aspect 37: A device for wireless communication, comprising one or more memories and one or more processors coupled to the one or more memories, the one or more processors configured to perform the method of one or more of Aspects 1-35.

Aspect 38: An apparatus for wireless communication, comprising at least one means for performing the method of one or more of Aspects 1-35.

Aspect 39: A non-transitory computer-readable medium storing code for wireless communication, the code comprising instructions executable by one or more processors to perform the method of one or more of Aspects 1-35.

Aspect 40: A non-transitory computer-readable medium storing a set of instructions for wireless communication, the set of instructions comprising one or more instructions that, when executed by one or more processors of a device, cause the device to perform the method of one or more of Aspects 1-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
transmitting, to a network node, a capability report indicating one or more capability parameters, associated with wideband interference measurement of an orthogonal frequency division multiplexing (OFDM) channel, and indicating a supported subband size for the OFDM channel;
receiving, from the network node and based on the transmission of the capability report, configuration information indicating an interference measurement resource associated with a set of frequency domain resources, wherein the set of frequency domain resources includes a greater number of frequency domain resources than the supported subband size;
measuring, based on the reception of the configuration information, the interference measurement resource to obtain interference measurement information associated with the OFDM channel; and
transmitting, to the network node, a measurement report indicating the interference measurement information.

2. The method of claim 1,
wherein the measurement of the interference measurement resource comprises:
measuring the interference measurement resource using a receive chain associated with a frequency modulated continuous waveform based on the set of frequency domain resources including the greater number of frequency domain resources than the supported subband size.

3. The method of claim 1,
wherein the one or more capability parameters indicate that the UE supports wideband interference measurements of the OFDM channel using a receive chain associated with a frequency modulated continuous waveform.

4. The method of claim 1,
wherein the one or more capability parameters indicate a supported wideband bandwidth for the wideband interference measurement.

5. The method of claim 1,
wherein the one or more capability parameters indicate a supported analog-to-digital sampling rate for the wideband interference measurement.

6. The method of claim 1,
wherein the one or more capability parameters include a supported interference measurement granularity for the wideband interference measurement.

7. The method of claim 1,
wherein the configuration information indicates that the UE is to use a receive chain associated with a frequency modulated continuous waveform to measure the interference measurement resource.

8. The method of claim 1,
wherein the configuration information indicates a subband size associated with the interference measurement resource.

9. The method of claim 1,
wherein the interference measurement resource is associated with one or more subbands, and wherein the interference measurement information indicates one or more measurements for respective subbands of the one or more subbands.

10. The method of claim 1,
wherein the configuration information indicates one or more time domain resources associated with the interference measurement resource, and
wherein the interference measurement information indicates:
one or more measurements for respective time domain resources of the one or more time domain resources, or
a measurement for the one or more time domain resources.

11. A method of wireless communication performed by a network node, comprising:
receiving a capability report, associated with a user equipment (UE), indicating one or more capability parameters, associated with wideband interference measurement of an orthogonal frequency division multiplexing (OFDM) channel, and indicating a supported subband size for the OFDM channel;

transmitting, based on the reception of the capability report, configuration information for the UE indicating an interference measurement resource associated with a set of frequency domain resources, wherein the set of frequency domain resources includes a greater number of frequency domain resources than the supported subband size; and receiving a measurement report, associated with the UE, indicating interference measurement information associated with the interference measurement resource and the OFDM channel.

12. The method of claim 11, wherein the one or more capability parameters indicate that the UE supports wideband interference measurements of the OFDM channel using a receive chain associated with a frequency modulated continuous waveform.

13. The method of claim 11, wherein the one or more capability parameters indicate a supported wideband bandwidth for the wideband interference measurement.

14. The method of claim 11, wherein the one or more capability parameters indicate a supported analog-to-digital sampling rate for the wideband interference measurement.

15. The method of claim 11, wherein the one or more capability parameters include a supported interference measurement granularity for the wideband interference measurement.

16. A user equipment (UE) for wireless communication, comprising:

one or more memories; and one or more processors, coupled to the one or more memories, individually or collectively configured to cause the UE to:

transmit, to a network node, a capability report indicating one or more capability parameters, associated with wideband interference measurement of an orthogonal frequency division multiplexing (OFDM) channel, and indicating a supported subband size for the OFDM channel;

receive, from the network node and based on the transmission of the capability report, configuration information indicating an interference measurement resource associated with a set of frequency domain resources, wherein the set of frequency domain resources includes a greater number of frequency domain resources than the supported subband size;

measure, based on the reception of the configuration information, the interference measurement resource to obtain interference measurement information associated with the OFDM channel; and transmit, to the network node, a measurement report indicating the interference measurement information.

17. The UE of claim 16, wherein the one or more processors, to cause the UE to measure of the interference measurement resource, are individually or collectively configured to cause the UE to:

measure the interference measurement resource using a receive chain associated with a frequency modulated continuous waveform based on the set of frequency domain resources including the greater number of frequency domain resources than the supported subband size.

18. The UE of claim 16, wherein the one or more capability parameters indicate that the UE supports wideband interference measurements of the OFDM channel using a receive chain associated with a frequency modulated continuous waveform.

19. The UE of claim 16, wherein the one or more capability parameters indicate a supported wideband bandwidth for the wideband interference measurement.

20. The UE of claim 16, wherein the interference measurement information indicates one or more measurement values associated with the interference measurement resource.

21. The UE of claim 16, wherein the interference measurement resource is associated with one or more subbands, and wherein the interference measurement information indicates one or more selected subbands of the one or more subbands.

22. The UE of claim 16, wherein the interference measurement resource is a periodic resource or an aperiodic resource.

23. The UE of claim 16, wherein the measurement report is a periodic measurement report or an aperiodic measurement report.

24. The UE of claim 16, wherein the interference measurement resource is associated with multiple UEs including the UE.

25. The UE of claim 16, wherein the one or more capability parameters include one or more timing gap parameters for the wideband interference measurement.

26. The UE of claim 25, wherein the one or more timing gap parameters include at least one of:

a first timing gap parameter indicating a first supported timing gap between the reception of the configuration information and the measurement of the interference measurement resource, or a second timing gap parameter indicating a second supported timing gap between the measurement of the interference measurement resource and the transmission of the measurement report.

27. The UE of claim 16, wherein the interference measurement resource is a zero-power resource.

28. A network node for wireless communication, comprising:

one or more memories; and one or more processors, coupled to the one or more memories, individually or collectively configured to cause the network node to:

receive a capability report, associated with a user equipment (UE), indicating one or more capability parameters, associated with wideband interference measurement of an orthogonal frequency division multiplexing (OFDM) channel, and indicating a supported subband size for the OFDM channel;

transmit, based on the reception of the capability report, configuration information for the UE indicating an interference measurement resource associated with a set of frequency domain resources, wherein the set of frequency domain resources includes a greater number of frequency domain resources than the supported subband size; and receive a measurement report, associated with the UE, indicating interference measurement information associated with the interference measurement resource and the OFDM channel.

29. The network node of claim 28, wherein the one or more capability parameters indicate that the UE supports wideband interference measurements of the OFDM channel using a receive chain associated with a frequency modulated continuous waveform.

30. The network node of claim 28, wherein the one or more capability parameters indicate a supported wideband bandwidth for the wideband interference measurement.

\* \* \* \* \*